US008327711B2

(12) United States Patent
Kasai et al.

(10) Patent No.: US 8,327,711 B2
(45) Date of Patent: Dec. 11, 2012

(54) ELECTROSTATIC CAPACITIVE VIBRATING SENSOR

(75) Inventors: Takashi Kasai, Kusatsu (JP); Kazuyuki Ono, Anjo (JP); Yoshitaka Tsurukame, Kusatsu (JP)

(73) Assignee: OMRON Corporation, Kyoto (JP)

( * ) Notice: Subject to any disclaimer, the term of this patent is extended or adjusted under 35 U.S.C. 154(b) by 190 days.

(21) Appl. No.: 12/674,696

(22) PCT Filed: Feb. 18, 2009

(86) PCT No.: PCT/JP2009/000663
§ 371 (c)(1), (2), (4) Date: Feb. 23, 2010

(87) PCT Pub. No.: WO2009/104389
PCT Pub. Date: Aug. 27, 2009

(65) Prior Publication Data

US 2010/0212432 A1 Aug. 26, 2010

(30) Foreign Application Priority Data

Feb. 20, 2008 (JP) ................................ 2008-039048

(51) Int. Cl.
*G01M 3/32* (2006.01)

(52) U.S. Cl. ........................................... 73/662; 73/649

(58) Field of Classification Search .................... 73/649, 73/654, 1.82, 570, 662
See application file for complete search history.

(56) References Cited

U.S. PATENT DOCUMENTS 4,628,740 A * 12/1986 Ueda et al. ...................... 73/705
4,776,019 A * 10/1988 Miyatake ...................... 381/174
4,908,805 A * 3/1990 Sprenkels et al. ............ 367/181
4,910,840 A * 3/1990 Sprenkels et al. ........... 29/25.41
5,449,909 A * 9/1995 Kaiser et al. ............... 250/336.1
5,531,787 A * 7/1996 Lesinski et al. ................. 623/10
6,012,335 A * 1/2000 Bashir et al. ..................... 73/724
6,535,460 B2 3/2003 Loeppert et al.
6,870,939 B2 * 3/2005 Chiang et al. ................ 381/175

(Continued)

FOREIGN PATENT DOCUMENTS

JP 07-026887 A 1/1995

(Continued)

OTHER PUBLICATIONS

International Search Report w/translation from PCT/JP2009/000663 dated May 26, 2009 (2 pages).

(Continued)

*Primary Examiner* — Peter Macchiarolo
*Assistant Examiner* — Samir M Shah
(74) *Attorney, Agent, or Firm* — Osha Liang LLP

(57) ABSTRACT

An electrostatic capacitive vibration sensor has a substrate, a through-hole, a vibrating electrode plate, and a fixed electrode plate opposite the vibrating electrode plate. The fixed electrode plate is subjected to vibration to perform membrane oscillation. Pluralities of acoustic holes are made in the fixed electrode plate. The vibrating and fixed electrode plate are disposed on a surface side of the substrate such that an opening on the surface side of the through-hole is covered. A lower surface of an outer peripheral portion of the vibrating electrode plate is partially fixed to the substrate. A vent hole that communicates a surface side and a rear surface side of the vibrating electrode plate is made between the surface of the substrate and the lower surface of the vibrating electrode plate. In addition, the acoustic hole has a smaller opening area except at the outer peripheral portion.

6 Claims, 18 Drawing Sheets

U.S. PATENT DOCUMENTS

| | | | | |
|---|---|---|---|---|
| 7,146,016 | B2 * | 12/2006 | Pedersen | 381/175 |
| 7,152,481 | B2 * | 12/2006 | Wang | 73/718 |
| 7,301,213 | B2 * | 11/2007 | Matsubara et al. | 257/416 |
| 7,362,873 | B2 * | 4/2008 | Pedersen | 381/175 |
| 7,400,737 | B2 * | 7/2008 | Pedersen | 381/175 |
| 7,449,356 | B2 * | 11/2008 | Weigold | 438/53 |
| 7,536,769 | B2 * | 5/2009 | Pedersen | 29/594 |
| 7,795,695 | B2 * | 9/2010 | Weigold et al. | 257/419 |
| 7,825,484 | B2 * | 11/2010 | Martin et al. | 257/415 |
| 7,829,366 | B2 * | 11/2010 | Miller et al. | 438/53 |
| 7,839,052 | B2 * | 11/2010 | Wu et al. | 310/321 |
| 7,885,423 | B2 * | 2/2011 | Weigold | 381/174 |
| 7,943,413 | B2 * | 5/2011 | Kasai et al. | 438/53 |
| 7,951,636 | B2 * | 5/2011 | Lee et al. | 438/53 |
| 7,961,897 | B2 * | 6/2011 | Weigold | 381/174 |
| 8,003,422 | B2 * | 8/2011 | Lee et al. | 438/53 |
| 8,094,844 | B2 * | 1/2012 | Sung | 381/191 |
| 8,104,354 | B2 * | 1/2012 | Hsu et al. | 73/718 |
| 8,121,315 | B2 * | 2/2012 | Song et al. | 381/174 |
| 8,126,167 | B2 * | 2/2012 | Hirade et al. | 381/174 |
| 8,134,215 | B2 * | 3/2012 | Shih et al. | 257/419 |
| 2002/0015636 | A1 * | 2/2002 | Lee et al. | 414/407 |
| 2002/0067663 | A1 * | 6/2002 | Loeppert et al. | 367/181 |
| 2007/0201709 | A1 | 8/2007 | Suzuki et al. | |
| 2008/0019543 | A1 * | 1/2008 | Suzuki et al. | 381/174 |
| 2009/0181489 | A1 * | 7/2009 | Horimoto et al. | 438/53 |
| 2009/0190782 | A1 * | 7/2009 | Suzuki et al. | 381/174 |
| 2009/0218642 | A1 * | 9/2009 | Miller et al. | 257/416 |
| 2010/0002895 | A1 * | 1/2010 | Notake et al. | 381/174 |
| 2010/0176821 | A1 * | 7/2010 | Kasai et al. | 324/660 |
| 2011/0140213 | A1 * | 6/2011 | Kasia et al. | 257/416 |
| 2011/0141854 | A1 * | 6/2011 | Lee et al. | 367/180 |
| 2011/0179876 | A1 * | 7/2011 | Kasai et al. | 73/649 |

FOREIGN PATENT DOCUMENTS

| | | | |
|---|---|---|---|
| JP | 2004-506394 | A | 2/2004 |
| JP | 2007-274293 | A | 10/2007 |
| JP | 2008-28513 | A | 7/2008 |
| KR | 10-0571967 | B1 | 4/2006 |
| WO | 02/15636 | A2 | 2/2002 |

OTHER PUBLICATIONS

Korean Examination Report issued in Korean Application No. 2010-7002986 mailed on May 27, 2011 and English translation thereof, 8 pages.

* cited by examiner

PRIOR ART (a)

PRIOR ART (b)

PRIOR ART (a)

PRIOR ART (b)

PRIOR ART

PRIOR ART

PRIOR ART

PRIOR ART (a)

ELECTROSTATIC CAPACITIVE VIBRATING SENSOR

TECHNICAL FIELD

The present invention relates to an electrostatic capacitive vibration sensor, particularly to a micro-size vibration sensor that is produced by utilizing a MEMS (Micro Electro Mechanical System) technology or a micromachining technology.

BACKGROUND ART

FIG. 1 illustrates a basic structure of the electrostatic capacitive vibration sensor. In a vibration sensor 11, a vibrating electrode plate 13 is disposed in an upper surface of a substrate 12 whose central portion is opened, an upper portion of the vibrating electrode plate 13 is covered with a fixed electrode plate 14, and plural acoustic holes 15 are made in the fixed electrode plate 14. When an acoustic vibration 16 propagates toward the vibration sensor 11, the acoustic vibration 16 vibrates the vibrating electrode plate 13 through the acoustic holes 15. Because a distance between the vibrating electrode plate 13 and the fixed electrode plate 14 changes when the vibrating electrode plate 13 is vibrated, the acoustic vibration 16 (air vibration) can be converted into an electric signal and be output by detecting a change in electrostatic capacitance between the vibrating electrode plate 13 and the fixed electrode plate 14.

In the vibration sensor 11, the acoustic holes 15 perform the following functions:

(1) a function of not applying a sound pressure to a fixed film, (2) a function of reducing damping of the vibrating electrode plate to improve a high-frequency characteristic, and (3) a function as an etching hole in preparing an air gap.

The acoustic hole 15 also has a large influence on a function of a vent hole. The functions of the acoustic hole and vent hole will be described below.

(Function of Not Applying Sound Pressure to Fixed Film)

In the vibration sensor 11, the vibrating electrode plate 13 is forcedly vibrated by the acoustic vibration 16 to detect the acoustic vibration 16. When the fixed electrode plate 14 is simultaneously vibrated along with the vibrating electrode plate 13, detection accuracy of the acoustic vibration is degraded. Therefore, in the vibration sensor 11, rigidity of the fixed electrode plate 14 is set higher than that of the vibrating electrode plate 13, and the acoustic holes 15 are made in the fixed electrode plate 14 to cause the sound pressure to escape from the acoustic holes 15, whereby the fixed electrode plate 14 is hardly vibrated by the sound pressure.

(Function of Reducing Damping of Vibrating Electrode Plate to Improve High-Frequency Characteristic)

When the acoustic holes 15 are not made, air is trapped in the air gap 17 (void) between the vibrating electrode plate 13 and the fixed electrode plate 14. Because the trapped air is compressed or expanded according to the vibration of the vibrating electrode plate 13, the vibration of the vibrating electrode plate 13 is damped by the air. On the other hand, when the acoustic holes 15 are made in the fixed electrode plate 14, because the air enters and exits the air gap 17 through the acoustic holes 15, the vibration of the vibrating electrode plate 13 is hardly damped, thereby improving the high-frequency characteristic of the vibration sensor 11.

(Function as Etching Hole in Preparing Air Gap)

In a method for forming an air gap 17 between the fixed electrode plate 14 and the vibrating electrode plate 13 by a surface micromachining technology, a sacrifice layer is formed between the substrate 12 and the vibrating electrode plate 13 or between the vibrating electrode plate 13 and the fixed electrode plate 14. An etching solution is introduced to the inside from the acoustic holes 15 made in the fixed electrode plate 14, and the sacrifice layer is removed by etching to form the air gap 17 between the vibrating electrode plate 13 and the fixed electrode plate 14.

(Relationship Between Vent Hole and Acoustic Hole)

A through-hole or a recess is provided in the substrate 12 so as not to interfere with the vibration of the vibrating electrode plate 13. When the recess (back chamber 18) is provided in an upper surface of the substrate 12, the back chamber 18 is closed on the lower surface side of the substrate. For the through-hole, although the through-hole pierces from the upper surface of the substrate to the lower surface, frequently the lower surface of the through-hole is closed by a wiring substrate by mounting the vibration sensor on the wiring substrate (accordingly, hereinafter the case of the through-hole is also referred to as back chamber 18). Therefore, occasionally a pressure in the back chamber 18 differs from an atmospheric pressure. Occasionally a pressure in the air gap 17 also differs from the atmospheric pressure due to a ventilation resistance.

As a result, a pressure difference is generated between the upper surface side (air gap 17) and the lower surface side (back chamber 18) of the vibrating electrode plate 13 according to a fluctuation in ambient pressure or a change in ambient temperature, and the vibrating electrode plate 13 is bent to possibly become a measurement error of the vibration sensor 11. In the general vibration sensor 11, as illustrated in FIG. 1, a vent hole 19 is made in the vibrating electrode plate 13 or between the vibrating electrode plate 13 and the substrate 12 to communicate the upper surface side and lower surface side of the vibrating electrode plate 13 to each other, thereby eliminating the pressure difference between the upper surface side and the lower surface side.

However, for the large acoustic hole 15 located near the vent hole 19, an acoustic resistance is decreased in a ventilation pathway 20 (indicated by an arrow of FIG. 1) from the acoustic hole 15 to the back chamber 18 through the vent hole 19. Therefore, the low-frequency acoustic vibration entering the vibration sensor 11 through the acoustic hole 15 near the vent hole 19 passes easily through the vent hole 19 to the back chamber 18. As a result, the low-frequency acoustic vibration passing through the acoustic hole 15 near the vent hole 19 leaks onto the side of the back chamber 18 without vibrating the vibrating electrode plate 13, and thereby degrading the low-frequency characteristic of the vibration sensor 11.

As illustrated in FIG. 2, when dust 23 such as dirt and micro particles invades from the acoustic hole 15, the dust 23 is deposited on the air gap or the vent hole. Because generally the vent hole 19 is narrower than the air gap, the vent hole 19 clogs when the dust 23 enters the vent hole 19, which results in interference of the vibration of the vibrating electrode plate 13 or a change in the number of vibrations. Therefore, sensitivity of the vibration sensor or frequency characteristic is possibly degraded.

(Sticking of Electrode Plates)

In the vibration sensor 11 of FIG. 1, occasionally sticking of the electrode plates is generated during use or a production process. The sticking, as illustrated in FIG. 3(*b*), means a state in which part or substantial whole of the vibrating electrode plate 13 is fixed to the fixed electrode plate 14 and hardly separated from the fixed electrode plate 14. When the vibrating electrode plate 13 sticks to the fixed electrode plate 14, because vibration of the vibrating electrode plate 13 is prevented, the vibration sensor 11 cannot detect the acoustic vibration.

FIGS. 3(*a*) and 3(*b*) are schematic diagrams explaining a cause of generation of the sticking in the vibration sensor 11. Because the vibration sensor 11 is produced by utilizing the micromachining technology, for example, moisture w invades between the vibrating electrode plate 13 and the fixed electrode plate 14 in a cleaning process after etching. Even in use of the vibration sensor 11, occasionally the moisture remains between the vibrating electrode plate 13 and the fixed electrode plate 14 or the vibration sensor 11 is wetted.

On the other hand, because the vibration sensor 11 has micro dimensions, there is only a gap of several micrometers between the vibrating electrode plate 13 and the fixed electrode plate 14. Additionally, because the vibrating electrode plate 13 has a thickness of about 1 micrometer in order to enhance the sensitivity of the vibration sensor 11, the vibrating electrode plate 13 has a weak spring property.

Therefore, in the vibration sensor 11, occasionally the sticking is generated through the following two-stage process. In a first stage, as illustrated in FIG. 3(*a*), when the moisture w invades between the vibrating electrode plate 13 and the fixed electrode plate 14, the vibrating electrode plate 13 is attracted to the fixed electrode plate 14 by a capillary force P1 or a surface tension of the moisture w.

In a second stage, as illustrated in FIG. 3(*b*), after the moisture w between the vibrating electrode plate 13 and the fixed electrode plate 14 is evaporated, the vibrating electrode plate 13 sticks to the fixed electrode plate 14, and the sticking state is maintained. An intermolecular force, an interfacial force, and an electrostatic force, which act between the surface of the vibrating electrode plate 13 and the surface of the fixed electrode plate 14, can be cited as an example of a force P2 that fixes and maintains the vibrating electrode plate 13 to and in the fixed electrode plate 14 after the moisture w is evaporated. As a result, the vibrating electrode plate 13 is retained while sticking to the fixed electrode plate 14, and the vibration sensor 11 malfunctions.

In the first stage, the vibrating electrode plate 13 sticks to the fixed electrode plate 14 by the capillary force of the invading moisture. However, in some cases, the vibrating electrode plate sticks to the fixed electrode plate by a liquid except the moisture, and the vibrating electrode plate sticks to the fixed electrode plate by applying the large sound pressure to the vibrating electrode plate. Occasionally, the vibrating electrode plate takes on static electricity to stick to the fixed electrode plate, thereby generating the process in the first stage.

(Thermal Noise)

The inventors found that a noise generated in the vibration sensor is caused by a thermal noise (fluctuation of air molecule) in the air gap 17 between the vibrating electrode plate 13 and the fixed electrode plate 14. As illustrated in FIG. 4(*a*), air molecules α existing in the air gap 17 between the vibrating electrode plate 13 and the fixed electrode plate 14, that is, a quasi-closed space collide with the vibrating electrode plate 13 by the fluctuation, a micro force generated by the collision with the air molecules α acts on the vibrating electrode plate 13, and the micro force acting on the vibrating electrode plate 13 varies randomly. Therefore, the vibrating electrode plate 13 is vibrated by the thermal noise, and an electric noise is generated in the vibration sensor. Particularly, in the high-sensitivity vibration sensor (microphone), the noise caused by the thermal noise is increased to degrade an S/N ratio.

According to knowledge obtained by the inventors, it is found that the noise caused by the thermal noise is reduced by making the acoustic holes 15 in the fixed electrode plate 14 as illustrated in FIG. 4(*b*). The inventors also obtained the knowledge that the noise is decreased, as an opening area of the acoustic hole 15 is enlarged, and as an interval at which the acoustic holes 15 are disposed is narrowed. This is attributed to the fact that, when the acoustic holes 15 are made in the fixed electrode plate 14, the air in the air gap 17 escapes easily from the acoustic hole 15, and the number of air molecules α colliding with the vibrating electrode plate 13 is decreased to reduce the noise.

(Well-Known Vibration Sensor)

For example, Patent Document 1 (Japanese Unexamined Patent Publication No. 2007-274293) discloses a capacitor microphone that is of the electrostatic capacitive vibration sensor. In the vibration sensor disclosed in Patent Document 1, as illustrated in FIGS. 1 and 2 of Patent Document 1, a vibrating electrode plate (12) (the numeral in parenthesis indicated about the vibration sensor of Patent Document 1 is used as well as in Patent Document 1) is opposite to a fixed electrode plate (3), a vent hole (15) is made in an end portion of the vibrating electrode plate, and acoustic holes (5) having an even size are evenly arrayed in the fixed electrode plate.

However, in the vibration sensor of Patent Document 1, because of the even size of the acoustic hole, when the opening area of the acoustic hole is enlarged, the acoustic hole near the vent hole is enlarged to decrease the acoustic resistance of the ventilation pathway including the vent hole. As a result, unfortunately the low-frequency characteristic of the vibration sensor is degraded.

Additionally, when the opening area of the acoustic hole is enlarged, the dust invades easily from the acoustic holes near the vent hole, and the vent hole clogs easily by the invading dust (see FIG. 2). Therefore, the vibration characteristic of the vibration electrode film varies to easily change the sensitivity or frequency characteristic of the vibration sensor.

On the other hand, in the vibration sensor of Patent Document 1, because the damping suppression effect of the vibrating electrode plate is lowered when the opening area of the acoustic hole is reduced, the high-frequency characteristic of the vibration sensor is lowered. Additionally, when the opening area of the acoustic hole is reduced, because the fixed electrode plate is easily subjected to the sound pressure, accuracy of the vibration sensor is also easy to be lower.

Accordingly, there is a contradictory problem in the vibration sensor of Patent Document 1. That is, when the opening area of the acoustic hole is enlarged, the low-frequency characteristic of the vibration sensor is lowered, or the change of the sensor characteristic is easily increased by the dust. On the other hand, when the opening area of the acoustic hole is reduced, the high-frequency characteristic is lowered, or the sensor accuracy is largely degraded by the fixed electrode plate subjected to the sound pressure.

Further, the sticking problem exists in the vibration sensor that is prepared by utilizing the micromachining technology, and the sticking is correlated with a contact area of the vibrating electrode plate and the fixed electrode plate. Therefore, when the opening area of the acoustic hole is reduced in the vibration sensor of Patent Document 1, unfortunately the sticking of the electrode plates is easy to generate.

According to knowledge obtained by the inventors, when the opening area of the acoustic hole is reduced in the vibration sensor of Patent Document 1, unfortunately the noise caused by the thermal noise of the vibration sensor is increased.

(Another Well-Known Vibration Sensor)

For example, Patent Document 2 (U.S. Pat. No. 6,535,460) discloses another vibration sensor. In the vibration sensor of Patent Document 2, as illustrated in FIGS. 2 and 3 of Patent Document 2, a vibrating electrode plate (12) (the numeral in parenthesis indicated about the vibration sensor of Patent Document 2 is used as well as in Patent Document 2) is opposite to a fixed electrode plate (40), and a void is formed between the vibrating electrode plate and a substrate (30). A circular-ring-shape projected strip (41) is formed in a lower surface of the fixed electrode plate, ventilation holes (21) are made in a circular region located inside the projected strip of the fixed electrode plate, and ventilation holes (14) are made in a circular-ring-shape region located outside the projected strip of the fixed electrode plate. Each opening area in the ventilation hole (21) located inside the projected strip is larger than that of the outside ventilation hole, and the ventilation holes (21) are regularly arrayed at intervals smaller than those of the outside ventilation holes. Each opening area in the ventilation hole (14) located outside the projected strip is smaller than that of the inside ventilation hole, and the ventilation holes (14) are unevenly formed at intervals larger than those of the inside ventilation holes.

However, in the vibration sensor of Patent Document 2, the inner-peripheral-portion ventilation hole (21) provided in the fixed electrode plate differs significantly from the outer-peripheral-portion ventilation hole (14) in the array interval, and the outer-peripheral-portion ventilation holes are unevenly arrayed. Therefore, during producing the vibration sensor, unfortunately an etching required time is unnecessarily lengthened while the etching becomes uneven in a process for etching the sacrifice layer formed between the vibrating electrode plate and the fixed electrode plate.

FIG. 5 illustrates the case in which the acoustic holes 15 (ventilation holes) are unevenly disposed in the vibration sensor 11 of FIG. 1. FIG. 5(*a*) is a schematic plan view illustrating a state in which a sacrifice layer 22 is being removed by the etching through the unevenly disposed acoustic holes 15, FIG. 5(*b*) is a sectional view taken on a line X-X of FIG. 5(*a*), and FIG. 5(*c*) is a schematic plan view illustrating a state in which the removal of the sacrifice layer 22 is completed by the etching through the unevenly disposed acoustic holes 15.

When the acoustic holes 15 are unevenly disposed as illustrated in FIG. 5(*a*), because etching solutions invading from the acoustic holes 15 have the same etching rate, the sacrifice layer 22 is unevenly etched, as illustrated in FIG. 5(*b*), the sacrifice layer 22 is rapidly etched in a region where the interval between the acoustic holes 15 is narrowed, and the sacrifice layer 22 is slowly etched in a region where the interval between the acoustic holes 15 is widened. Therefore, in the region where the interval between the acoustic holes 15 is widened, a time necessary for etching the sacrifice layer 22 is lengthened, and eventually the etching required time is unnecessarily lengthened. In the region where the interval between the acoustic holes 15 is shortened, because the etching is continued even after the sacrifice layer 22 is etched to expose the fixed electrode plate 14 and the vibrating electrode plate 13, an etching degree of the fixed electrode plate 14 becomes large as illustrated in FIG. 5(*c*). As a result, an uneven stress is applied to the fixed electrode plate 14 even in the middle of the etching process, and possibly the fixed electrode plate 14 breaks. Even if the fixed electrode plate 14 does not lead to the breakage, because of the uneven disposition of the acoustic holes 15, a bias is generated in the etching degree of the fixed electrode plate 14, that is, a partial thickness of the fixed electrode plate 14, which possibly causes a characteristic defect of the vibration sensor.

Accordingly, even in the vibration sensor of Patent Document 2, the bias is generated in the etching degree because of the uneven disposition of the ventilation holes (21 and 14), unfortunately a defect occurrence rate of the vibration sensor is increased or the etching required time is unnecessarily lengthened.

In the vibration sensor of Patent Document 2, the vibrating electrode plate except a wiring lead portion is separated from the substrate, the vibrating electrode plate is sucked onto the fixed electrode plate side by an electrostatic attractive force acting between the vibrating electrode plate and the fixed electrode plate in used of the vibration sensor, and the vibrating electrode plate abuts on the lower surface of the projected strip. Therefore, because the air gap between the vibrating electrode plate and the fixed electrode plate becomes a substantially closed space surrounded by the projected strip, the lower-surface-side space (back chamber) and upper-surface-side space (air gap) of the vibrating electrode plate are partitioned by the projected strip and not communicated with each other although the void is formed between the vibrating electrode plate and the substrate. That is, in the vibration sensor of Patent Document 2, the void between the vibrating electrode plate and the substrate neither functions as the vent hole nor is the vent hole.

Similarly, although the ventilation hole (21) on the inner peripheral side is communicated with the air gap to function as the acoustic hole, the ventilation hole (14) on the outer peripheral side does not function as the acoustic hole because the ventilation hole (14) is not communicated with the air gap. Therefore, only the ventilation hole (21) on the inner peripheral side becomes the acoustic hole in the vibration sensor of Patent Document 2, and the acoustic holes having the even opening area are regularly arrayed in the vibration sensor of Patent Document 2 like the vibration sensor of Patent Document 1.

Further, in the vibration sensor of Patent Document 2, because the vibrating electrode plate is sucked onto the fixed electrode plate side to abut on the lower surface of the projected strip by the electrostatic attractive force, the upper surface of the vibrating electrode plate is retained in or substantially fixed to the lower surface of the projected strip over the whole circumference, and unfortunately the vibration of the vibrating electrode plate is suppressed by the contact with the projected strip to easily lower the sensitivity of the vibration sensor.

Patent Document 1: Japanese Unexamined Patent Publication No. 2007-274293

Patent Document 2: U.S. Pat. No. 6,535,460

SUMMARY OF INVENTION

One or more embodiments of the invention provides a vibration sensor that can solve the contradictory problem. That is, in the contradictory problem, because the acoustic resistance of the ventilation pathway passing through the vent hole is decreased when the opening area of the acoustic hole is enlarged, the low-frequency characteristic of the vibration sensor is lowered or the vent hole clogs easily by the dust to lower the dust-proof property. On the other hand, when the opening area of the acoustic hole is reduced, the damping suppression effect of the vibrating electrode plate is degraded to lower the high-frequency characteristic of the vibration sensor, the fixed electrode plate is easily subjected to the sound pressure to lower the sensor accuracy, the sticking of the electrode plates is easily generated, or the noise generated by the thermal noise is increased in the air gap.

In accordance with one aspect of the present invention, there is provided an electrostatic capacitive vibration sensor including a substrate in which a through-hole penetrating the substrate is made, a vibrating electrode plate and a fixed electrode plate being opposite to each other, the fixed electrode plate being subjected to vibration to perform membrane oscillation, a plurality of acoustic holes being made in the fixed electrode plate, the vibrating electrode plate and the fixed electrode plate being disposed on a surface side of the substrate such that an opening on the surface side of the substrate of the through-hole is covered therewith, wherein a lower surface of an outer peripheral portion of the vibrating electrode plate is partially fixed to the substrate, a vent hole that communicates a surface side and a rear surface side of the vibrating electrode plate with each other is made between the surface of the substrate and the lower surface of the vibrating electrode plate, and in a region opposite to the vibrating electrode plate in the fixed electrode plate, the acoustic hole having an opening area smaller than that of the acoustic hole made except the outer peripheral portion in the region is made in the outer peripheral portion in the region. As used herein, the opening area of the acoustic hole in the outer peripheral portion shall mean an opening area per acoustic hole. The opening area of the acoustic hole provided except the outer peripheral portion shall mean an opening area per acoustic hole, and the opening area of the acoustic hole provided except the outer peripheral portion shall mean an average opening area of the acoustic hole provided except the outer peripheral portion when the opening areas are not even.

In the electrostatic capacitive vibration sensor according to one aspect of the invention, the acoustic hole having the opening area smaller than that of the acoustic hole made except the outer peripheral portion in the region opposite to the vibrating electrode plate in the fixed electrode plate is made in the outer peripheral portion in the region. Therefore, the opening area of the acoustic hole can relatively be reduced near the outer peripheral portion of the region, that is, the vent hole, and the acoustic resistance of the ventilation pathway passing through the vent hole from the acoustic hole near the vent hole can be increased to improve the low-frequency characteristic of the vibration sensor.

Because the opening area of the acoustic hole can relatively be reduced near the vent hole, the vent hole hardly clogs by the dust invading from the acoustic hole, and the dust-proof property of the vibration sensor is improved to stabilize the sensitivity of the vibration sensor and the frequency characteristic.

On the other hand, the opening area of the acoustic hole made in the region except the outer peripheral portion of the region opposite to the vibrating electrode plate in the fixed electrode plate can relatively be enlarged, so that the damping of the vibrating electrode plate, which is caused by the air in the air gap between the vibrating electrode plate and the fixed electrode plate can effectively be suppressed to improve the high-frequency characteristic of vibration sensor. Further, because the opening area of the acoustic hole can relatively be enlarged in the region except the outer peripheral portion, the fixed electrode plate is hardly subjected to the sound pressure, and the sensor accuracy is improved. Further, because the opening area of the acoustic hole can relatively be enlarged in the region except the outer peripheral portion, the contact area between the vibrating electrode plate and the fixed electrode plate is reduced to hardly generate the sticking of the electrode plates. Further, because the opening area of the acoustic hole can relatively be enlarged in the region except the outer peripheral portion, the electric noise caused by the thermal noise of the vibration sensor can be reduced.

As a result, in the electrostatic capacitive vibration sensor according to one aspect of the invention, the contradictory problem of the conventional vibration sensor can be solved, and the vibration sensor having the good frequency characteristic from the low frequency to the high frequency, the good S/N ratio, the excellent sensor accuracy, in which the sticking of the electrode plates is hardly generated can be implemented.

In the electrostatic capacitive vibration sensor according to one aspect of the invention, because the lower surface of the outer peripheral portion of the vibrating electrode plate is partially fixed, the vibration is hardly suppressed when the vibrating electrode plate is subjected to the vibration, and the sensitivity of the vibration sensor is hardly lowered.

In the above aspect, a plurality of small regions are defined in an acoustic hole forming region of the fixed electrode plate, the small regions being regularly arrayed while having an even shape and an even area, and one acoustic hole is made in each small region such that a center of the acoustic hole falls within the small region. In the vibration sensor according to one aspect of the invention, because the acoustic holes can be arrayed regularly or substantially regularly, the whole of the sacrifice layer can substantially evenly be etched in the process for utilizing the micromachining technology to remove the sacrifice layer from the acoustic hole by the etching using the etching solution. As a result, the etching is substantially simultaneously completed in each portion of the sacrifice layer, so that the etching required time can be shortened. Additionally, because the partially excessively etching is hardly performed in the fixed electrode plate, the breakage of the fixed electrode plate is hardly generated, and the defect rate of the vibration sensor can be reduced.

In the above aspect, in the fixed electrode plate, a diameter of the small-opening-area acoustic hole made in the outer peripheral portion of the region opposite to the vibrating electrode plate ranges from 0.5 micrometer to 10 micrometers, a diameter of the acoustic hole made except the outer peripheral portion of the region ranges from 5 micrometers to 30 micrometers, and a center-to-center distance of the adjacent acoustic holes ranges from 10 micrometers to 100 micrometers. This is because the outer peripheral portion does not function as the acoustic hole (for example, function as the etching hole) when the diameter of the acoustic hole is lower than 0.5 micrometer in the outer peripheral portion of the region opposite to the vibrating electrode plate in the fixed electrode plate, and this is because the acoustic resistance of the ventilation pathway passing through to vent hole from the acoustic hole of the outer peripheral portion is excessively decreased to degrade the low-frequency characteristic or to generate the easy invasion of the dust when the diameter of the acoustic hole is more than 10 micrometers in the outer peripheral portion. This is because the acoustic resistance of the air gap is increased to increase the noise and the acoustic hole acts insufficiently as the acoustic hole when the diameter of the acoustic hole is lower than 5 micrometers in the region except the outer peripheral portion. This is because strength of the fixed electrode plate is excessively decreased while the area of the opposite electrodes is reduced to lower the sensor sensitivity when the diameter of the acoustic hole is more than 30 micrometers in the region except the outer peripheral portion. This is because the strength of the fixed electrode plate is excessively decreased while the area of the opposite electrodes is reduced to lower the sensitivity of the vibration sensor when the center-to-center distance between the adjacent acoustic holes is lower than 10 micrometers. This is because the acoustic resistance of the air gap is increased to increase the noise or the even etching of the sacrifice layer is hardly performed in removing the sacrifice layer by the etching when the center-to-center distance between the adjacent acoustic holes is more than 100 micrometers.

In the electrostatic capacitive vibration sensor according to one aspect of the invention, preferably a slit is opened to a region except the fixed portion in or near the outer peripheral portion of the vibrating electrode plate. In the electrostatic capacitive vibration sensor according to one aspect of the invention, because the slit is opened to the region except the fixed portion in or near the outer peripheral portion of the vibrating electrode plate, a spring constant of the vibrating electrode plate can be lowered to form the soft vibrating electrode plate, and the high-sensitivity vibration sensor can be implemented.

In the electrostatic capacitive vibration sensor according to one aspect of the invention, preferably plural retaining portions are disposed in the surface of the substrate at intervals, and the lower surface of the outer peripheral portion of the vibrating electrode plate is partially supported by the retaining portions. In the electrostatic capacitive vibration sensor according to one aspect of the invention, the vibrating electrode plate can be supported by the retaining portions to float the vibrating electrode plate from the substrate, and the vent hole can be formed between the substrate and the vibrating electrode plate.

Other aspects and advantages of the invention will be apparent from the following description and the appended claims.

DESCRIPTION OF SYMBOLS

Figure 1:
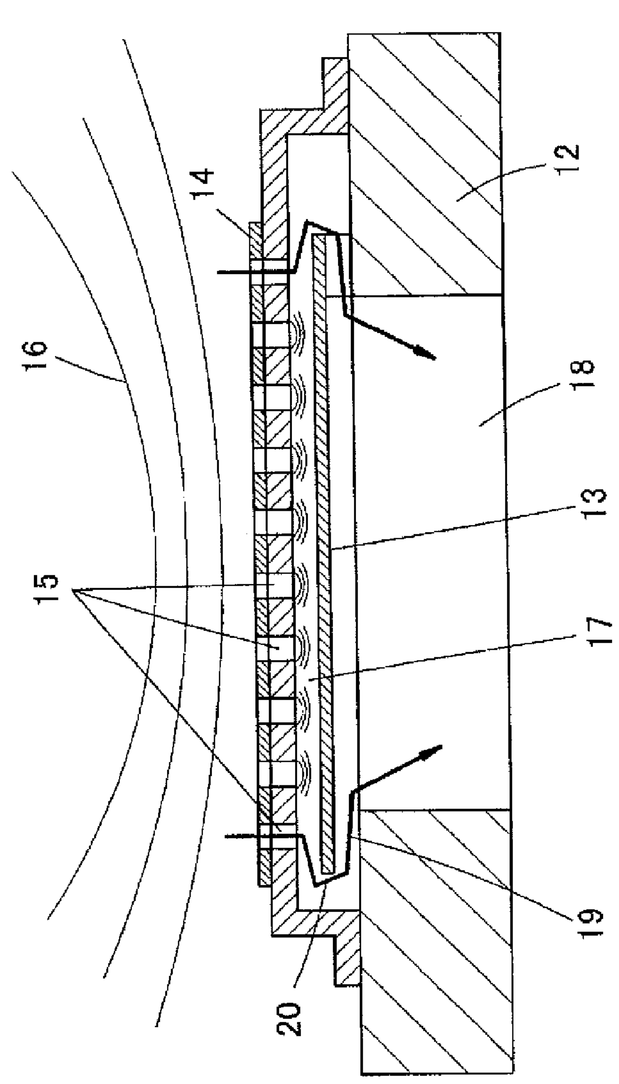
PRIOR ART Fig. 1
FIG. 1 is a sectional view illustrating a basic structure of an electrostatic capacitive vibration sensor.

31, 51, and 61 vibration sensor
32 silicon substrate
34 vibrating electrode plate
35 air gap
36 fixed electrode plate
37 through-hole
38 fixed portion
39 diaphragm
42 sacrifice layer
43*a* and 43*b* acoustic hole
44 electrode pad
45 vent hole
47 electrode pad
52 slit

DETAILED DESCRIPTION

Preferred embodiments of the invention will be described with reference to the accompanying drawings. However, the invention is not limited to the following embodiments, but various design changes can be made without departing from the scope of the invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(First Embodiment)

Figure 6:
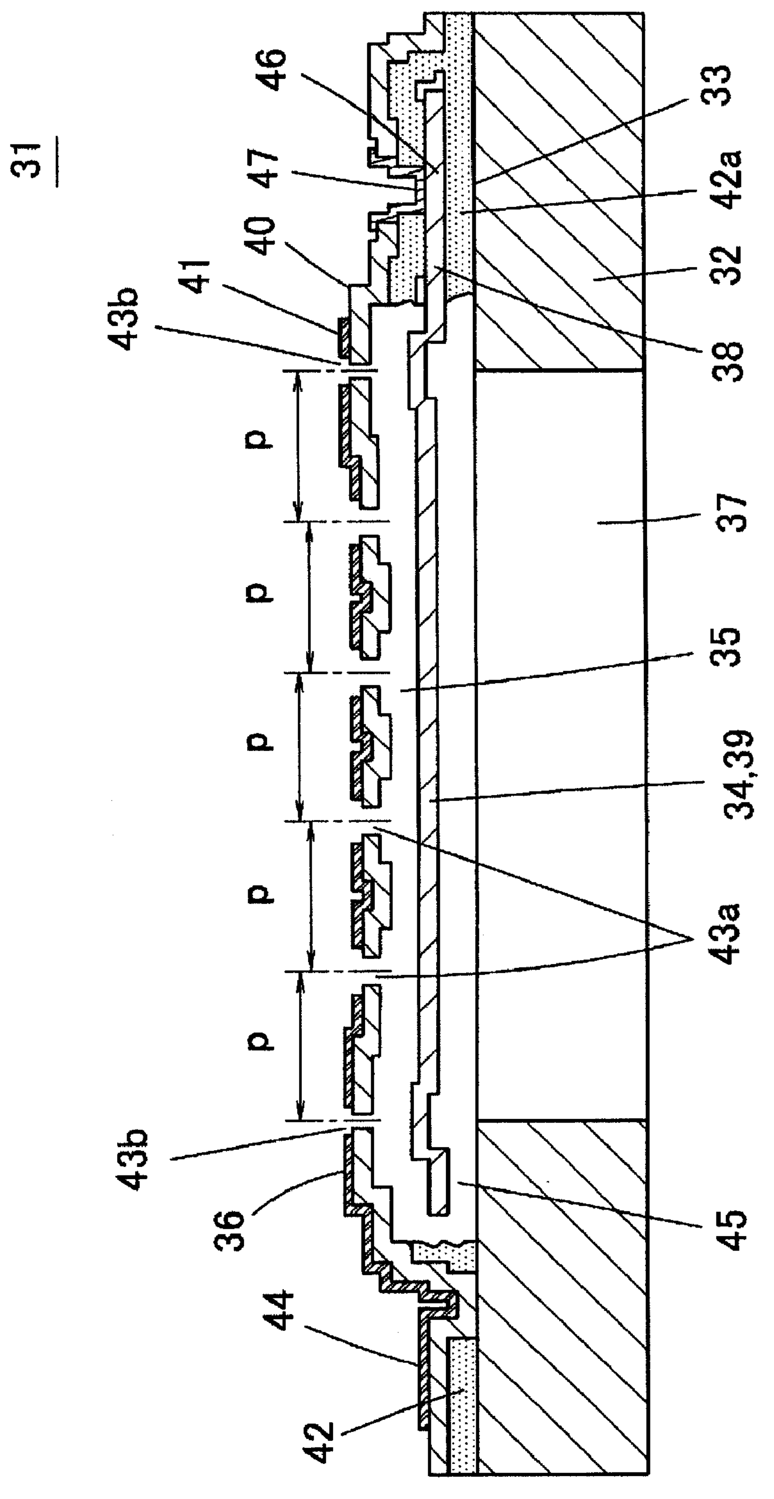
FIG. 6 is a schematic sectional view illustrating an electrostatic capacitive vibration sensor according to a first embodiment of the invention.
Figure 7:
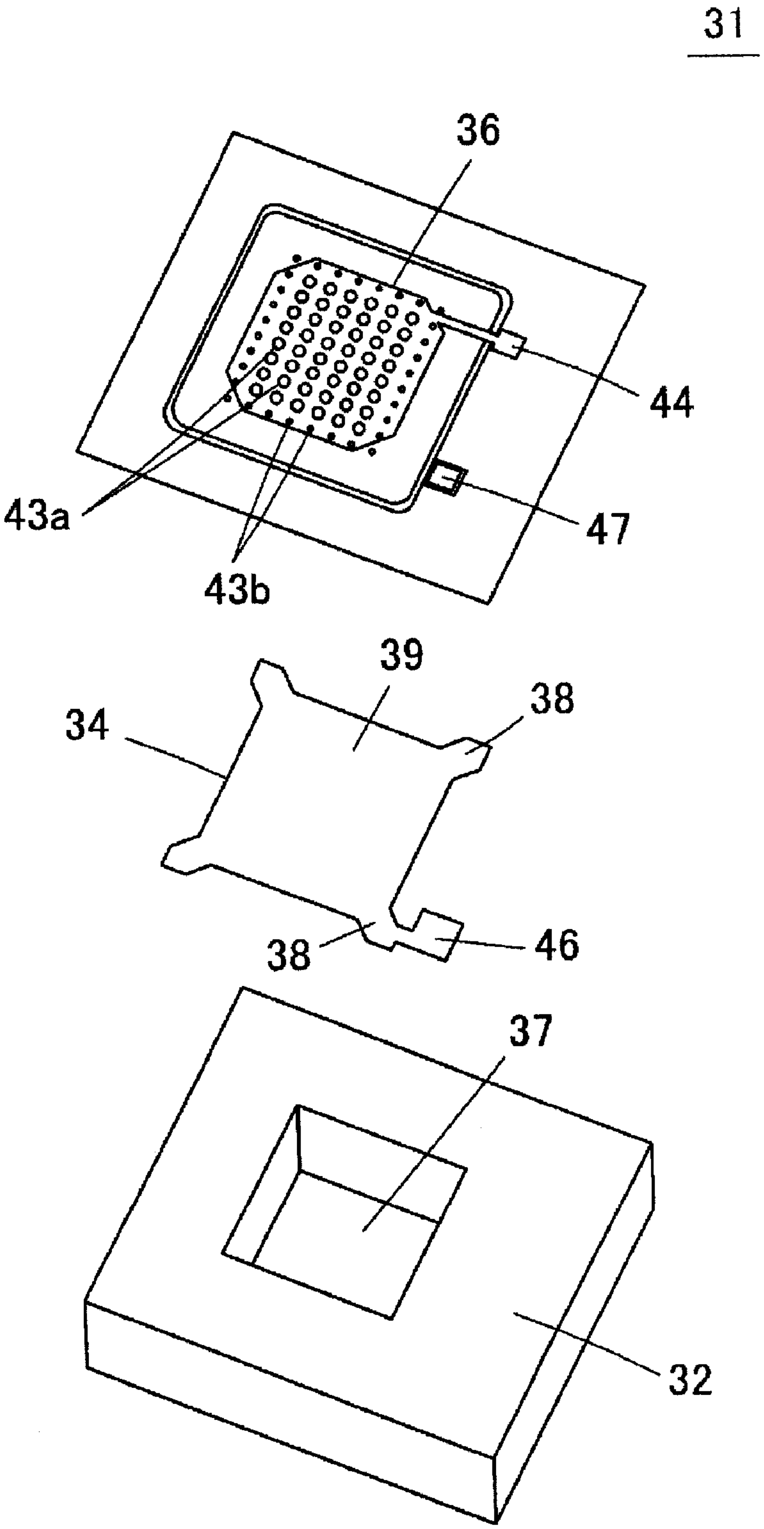
FIG. 7 is an exploded perspective view of the vibration sensor of the first embodiment.
Figure 8:
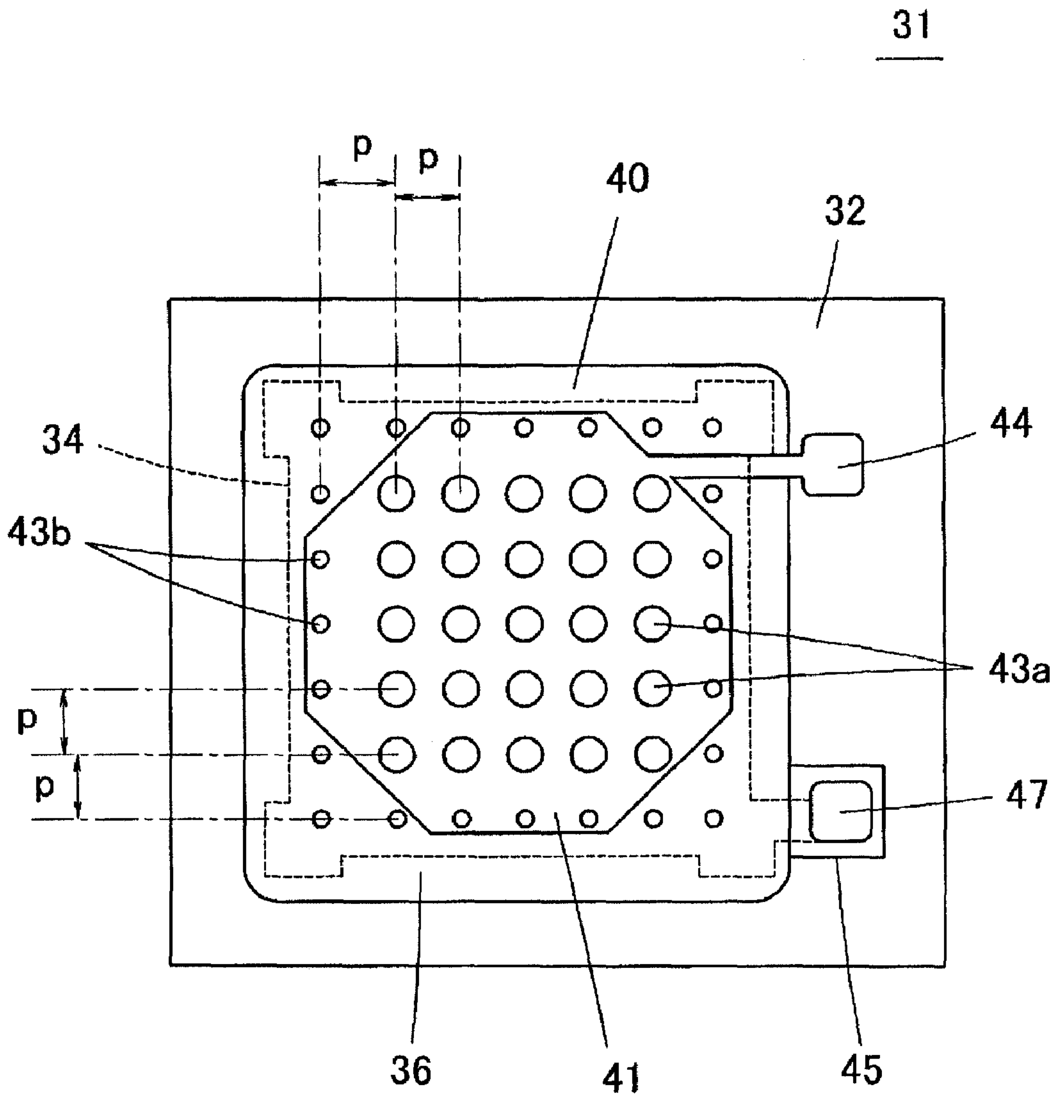
FIG. 8 is a plan view of the vibration sensor of the first embodiment.
Figure 9:
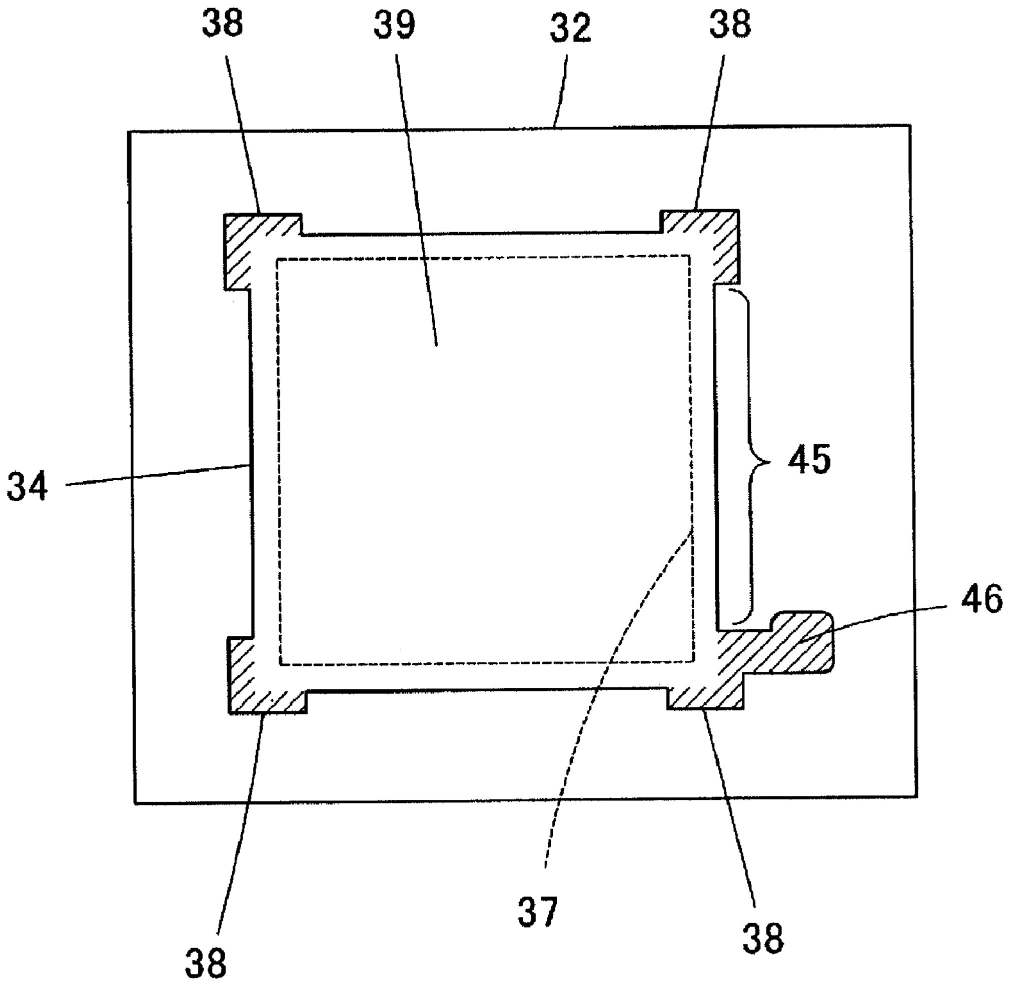
FIG. 9 is a plan view of a state in which a fixed electrode plate is removed in the vibration sensor of the first embodiment.

A first embodiment of the invention will be described with reference to FIGS. 6 to 12. FIG. 6 is a schematic sectional view illustrating an electrostatic capacitive vibration sensor 31 of the first embodiment, the right half of FIG. 6 illustrates a section passing through a fixed portion of a vibrating electrode plate, and the left half illustrates a section passing between the fixed portions. FIG. 7 is an exploded perspective view of the vibration sensor 31, FIG. 8 is a plan view of the vibration sensor 31, and FIG. 9 is a plan view illustrating a state in which the fixed electrode plate in an upper surface of the vibration sensor 31 is removed.

The vibration sensor 31 is an electrostatic capacitive sensor, in which a vibrating electrode plate 34 is provided in an upper surface of a silicon substrate 32 with an insulating coating 33 interposed therebetween, and a fixed electrode plate 36 is provided on the vibrating electrode plate 34 with a micro air gap 35 interposed therebetween. The vibration sensor 31 mainly detects sound and the like and the vibration sensor 31 converts the sound and the like into an electric signal to output the electric signal. The vibration sensor 31 is used as an acoustic sensor or a capacitor microphone.

As illustrated in FIGS. 6 and 7, a prismatic through-hole 37 or a truncated-pyramid recess (back chamber) is provided in the silicon substrate 32. FIGS. 6 and 7 illustrate the prismatic through-hole 37. The silicon substrate 32 has a size of 1 to 1.5 mm by 1 to 1.5 mm (can be formed smaller than this size) in planar view, and the silicon substrate 32 has a thickness of about 400 to about 500 mm. The insulating coating 33 formed by an oxide film or the like is formed in the upper surface of the silicon substrate 32.

The vibrating electrode plate 34 is formed by a polysilicon thin film having a thickness of about 1 micrometer. The vibrating electrode plate 34 is a substantially rectangular thin film, and fixed portions 38 are formed at four corners of the vibrating electrode plate 34. The vibrating electrode plate 34 is disposed in the upper surface of the silicon substrate 32 such that an upper surface opening of the through-hole 37 or recess is covered therewith, and each fixed portion 38 is fixed onto the insulating coating 33 with a sacrifice layer 42 interposed therebetween. In FIG. 9, a region fixed to the upper surface of the silicon substrate 32 is expressed by a hatched line in the vibrating electrode plate 34. A portion (in the first embodiment, portion except fixed portion 38 and extended portion 46) that is supported in the air above the through-hole 37 or recess in the vibrating electrode plate 34 constitutes a diaphragm 39 (moving portion) that senses the sound pressure to perform membrane oscillation. Because the fixed portion 38 is fixed onto a retaining portion 42*a* formed by a sacrifice layer 42, the vibrating electrode plate 34 floats slightly from the upper surface of the silicon substrate 32, and a void, that is, a vent hole 45 is formed between an edge of the diaphragm 39 and the upper surface of the silicon substrate 32 in each side between the fixed portions 38 at four corners.

In the fixed electrode plate 36, a fixed electrode 41 formed by a metallic thin film is provided in an upper surface of an insulating support layer 40 formed by a nitride film. The fixed electrode plate 36 is disposed above the vibrating electrode plate 34, and the fixed electrode plate 36 is fixed to the upper surface of the silicon substrate 32 in the outside of a region opposite to the diaphragm 39 while the sacrifice layer 42 (remainder after sacrifice layer etching) formed by an oxide film or the like is interposed therebetween. The diaphragm 39 is covered with the fixed electrode plate 36 with the air gap 35 of about 3 micrometer in the region opposite to the diaphragm 39.

Plural acoustic holes 43*a* and 43*b* are made in the fixed electrode 41 and the support layer 40 in order to pass the acoustic vibration therethrough so as to penetrate from the upper surface to the lower surface. An electrode pad 44 electrically connected to the fixed electrode 41 is provided in an end portion of the fixed electrode plate 36. Because the vibrating electrode plate 34 is vibrated by the sound pressure, the vibrating electrode plate 34 is formed into a thin film having a thickness of about 1 micrometer. On the other hand, because the fixed electrode plate 36 is not vibrated by the sound pressure, the fixed electrode plate 36 is formed into a thick film having a thickness of about 2 micrometer or more.

An electrode pad 47 is provided in an opening made in an end portion of the support layer 40 and an upper surface surrounding the end portion, a lower surface of the electrode pad 47 is electrically connected to an extended portion 46 of the vibrating electrode plate 34. Therefore, the vibrating electrode plate 34 and the fixed electrode plate 36 are electrically insulated from each other, and the vibrating electrode plate 34 and the fixed electrode 41 constitute a capacitor.

In the vibration sensor 31 of the first embodiment, when the acoustic vibration (air compressional wave) is incident from the upper surface side, the acoustic vibration reaches the diaphragm 39 through the acoustic holes 43*a* and 43*b* of the fixed electrode plate 36 to vibrate the diaphragm 39. When the diaphragm 39 is vibrated, a distance between the diaphragm 39 and the fixed electrode plate 36 is changed, thereby changing an electrostatic capacitance between the diaphragm 39 and the fixed electrode 41. Therefore, when the change in electrostatic capacitance is taken out as the electric signal while a DC voltage is applied between the electrode pads 44 and 47, the sound vibration can be detected by inverting the sound vibration into the electric signal.

The vibration sensor 31 is produced by utilizing the micromachining (semiconductor microfabrication) technology. Because the producing method is well known, the description is omitted.

Dispositions of the acoustic holes 43*a* and 43*b* made in the fixed electrode plate 36 will be described below. As illustrated in FIG. 8, in the fixed electrode plate 36, the acoustic holes 43*a* and 43*b* are made in a region opposite to the vibrating electrode plate 34 (more preferably a region opposite to the diaphragm 39). The acoustic holes 43*a* and 43*b* are regularly arrayed in the fixed electrode plate 36 according to a regular pattern such as a square shape, a hexagonal shape, and a zigzag shape. In FIG. 8, the acoustic holes 43*a* and 43*b* are arrayed at a constant pitch p into the square shape, and a pitch between the acoustic holes 43*a*, a pitch between the acoustic holes 43*b*, and a pitch between the acoustic hole 43*a* and the acoustic hole 43*b* are equal to one another. In the fixed electrode plate 36, the acoustic holes 43*b* are made in an outer peripheral portion of a region (hereinafter referred to as opposite region) opposite to the vibrating electrode plate 34 or diaphragm 39, and the acoustic holes 43*a* are made in a region (that is, inside region) except the outer peripheral portion of the opposite region. An opening area of the acoustic hole 43*b* is smaller than an opening area of the acoustic hole 43*a*. The outer peripheral portion means a region located within a distance of 100 micrometers or less from a position opposite to an edge (that is, end of vent hole 45) of the vibrating electrode plate 34.

In FIG. 8, the acoustic holes 43*a* are formed into an even size (opening area), and the acoustic holes 43*b* are formed into an even size (opening area). The sizes of the acoustic holes 43*a* and 43*b* may vary. However, for the substantially circular acoustic holes 43*a* and 43*b*, desirably a diameter Db of the acoustic hole 43*b* of the outer peripheral portion ranges from 0.5 micrometer to 10 micrometers, and desirably a diameter Da of the inside acoustic hole 43*a* ranges from 5 micrometers to 30 micrometers (where $Da>Db$). Desirably a center-to-center distance p (pitch) between the adjacent acoustic holes 43*a* and 43*b* ranges from 10 micrometers to 100 micrometers (where $p>Da$). The reason is described later.

Although the opening area of the acoustic hole 43*b* of the outer peripheral portion in the opposite region is smaller than the opening area of the acoustic hole 43*a* in the inside region, this does not mean that the acoustic hole 43*b* of the outer peripheral portion is smaller than any acoustic hole 43*a* in the inside region. Basically the opening area of the acoustic hole 43*a* in the inside region is larger than that of the acoustic hole 43*b* of the outer peripheral portion. However, even if a small number of the acoustic hole 43*a* having the same size as the acoustic hole 43*b* are made in the inside region, or even if a small number of acoustic holes 43*a* having the size smaller than that of the acoustic hole 43*b* are made in the inside region, there is little influence on the effect of the vibration sensor 31 of the first embodiment. Accordingly, when the acoustic holes 43*a* do not have the even size in the inside region, it is only necessary that the opening area of the acoustic hole 43*b* of the outer peripheral portion be smaller than an average value of the opening areas of the acoustic holes 43*a* in the inside region.

Desirably the pitch p of the acoustic holes 43$a$ and 43$b$ is kept constant. However, it is not always necessary that the acoustic holes 43$a$ and 43$b$ be arrayed at a constant pitch, as long as the acoustic holes 43$a$ and 43$b$ are substantially evenly distributed. That is, even if the acoustic holes 43$a$ and 43$b$ vary from the regular disposition, it is only necessary that the acoustic holes 43$a$ and 43$b$ be substantially regularly arrayed. As to the variation from the regular disposition, it is only necessary that a maximum value of the center-to-center distance between the acoustic holes 43$a$ and 43$b$ be equal to or lower than double a minimum value of the center-to-center distance. In other words, the dispositions of the acoustic holes 43$a$ and 43$b$ may be determined as follows.

Figure 10:
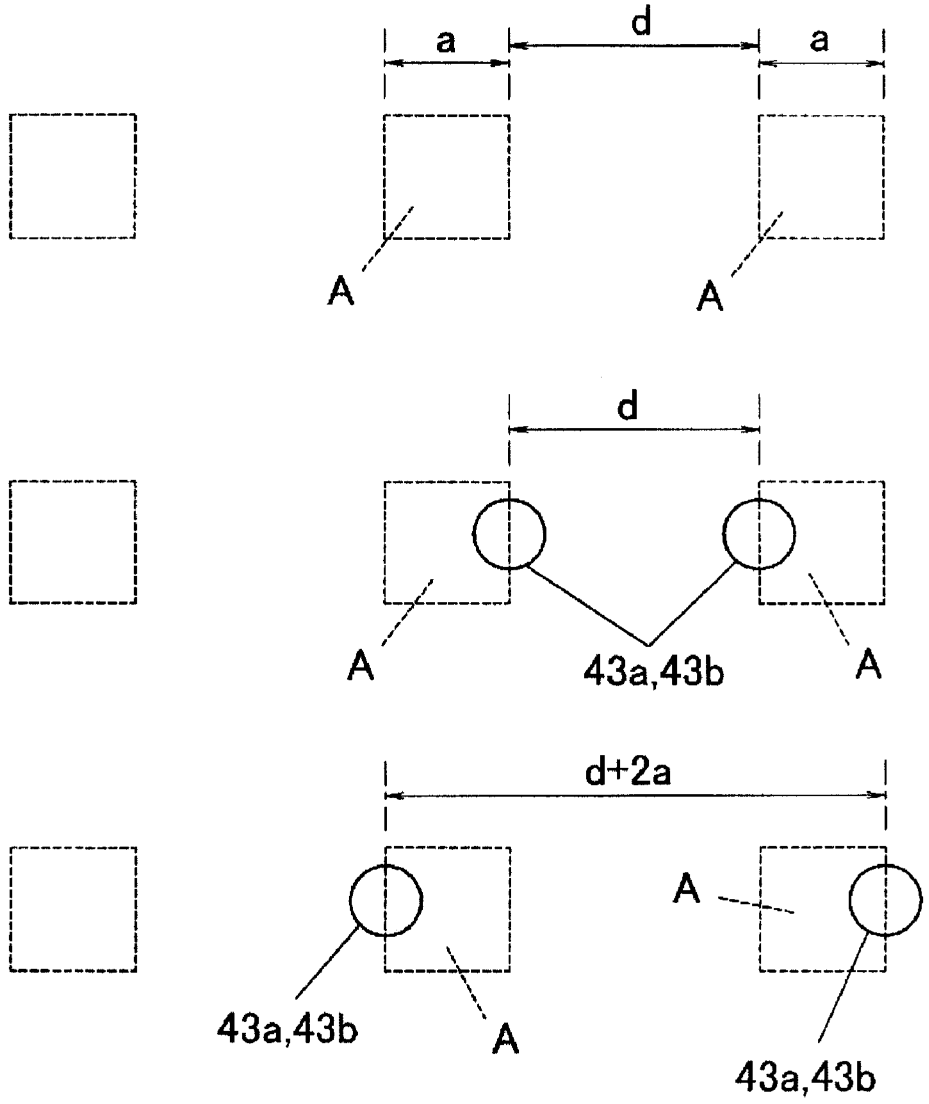
FIG. 10 is a view explaining how to dispose acoustic holes.

As illustrated in FIG. 10, it is assumed that small regions A formed into a square shape whose one side has a length a are regularly arrayed at intervals d in the acoustic hole forming region of the fixed electrode plate 36. Each of the acoustic holes 43$a$ and 43$b$ is appropriately disposed in arbitrary position of each small region A such that the center of each of the acoustic holes 43$a$ and 43$b$ falls within the small region A. As a result, the acoustic holes 43$a$ and 43$b$ are substantially regularly arrayed within a range of controlled variation. In the dispositions, the minimum center-to-center distance between the acoustic holes 43$a$ and 43$b$ becomes d as illustrated in the middle stage of FIG. 10, and the maximum center-to-center distance between the acoustic holes 43$a$ and 43$b$ becomes d+2a as illustrated in the lower stage of FIG. 10. Therefore, when the small region A is determined such that the relationship of $2a<d$ is satisfied, the maximum value of the center-to-center distance between the acoustic holes 43$a$ and 43$b$ becomes double the minimum value or less. When the interval d is set to 10 micrometers or more, the center-to-center distance p between the adjacent acoustic holes 43$a$ and 43$b$ becomes 10 micrometers or more. When the value of d+2a is set to 100 micrometers or less, the center-to-center distance p between the adjacent acoustic holes 43$a$ and 43$b$ becomes 100 micrometers or more. Therefore, the center-to-center distance p between the adjacent acoustic holes 43$a$ and 43$b$ is maintained in the range of 10 micrometers to 100 micrometers.

(Effect)

Thus, in the vibration sensor 31, because the opening area of the acoustic hole 43$b$ of the outer peripheral portion is smaller than the opening area of the acoustic hole 43$a$ in the inside region, the opening area of the acoustic hole 43$b$ is decreased near the vent hole 45. As a result, an acoustic resistance of a ventilation pathway (low-pitched sound pathway) from the acoustic hole 43$b$ near the vent hole 45 to the through-hole 37 through the vent hole 45 is increased, and the low-frequency acoustic vibration hardly leaks onto the side of the through-hole 37 through the ventilation pathway to improve a low-frequency characteristic of the vibration sensor 31.

Figure 2:
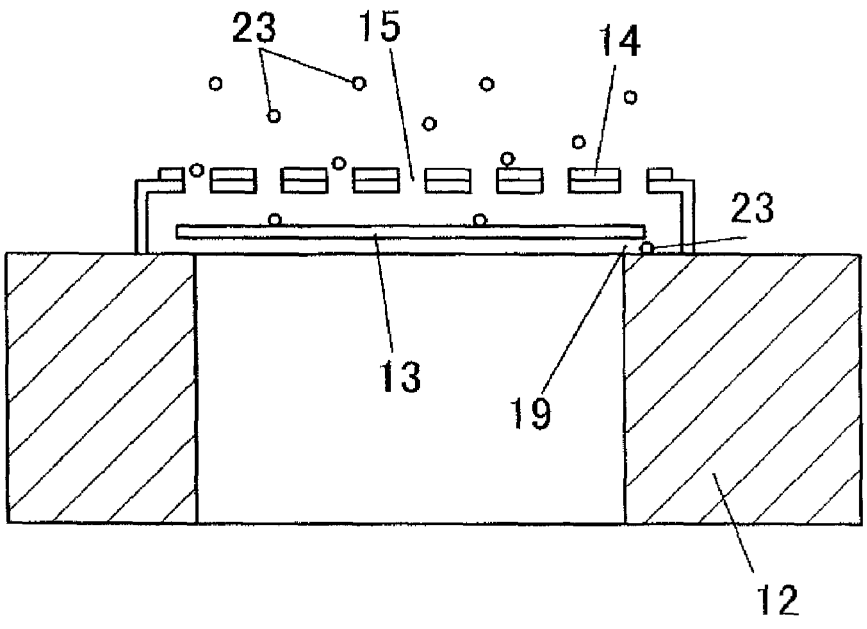
FIG. 2 is a schematic sectional view illustrating a state in which dust invades into a vibration sensor.
Figure 3:
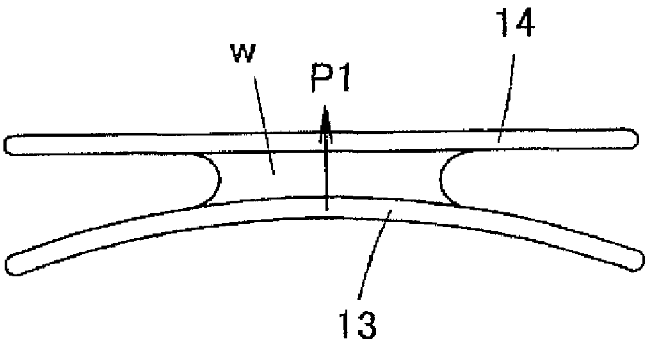
FIGS. 3(*a*) and (*b*) are schematic diagrams illustrating a state in which a vibrating electrode plate and a fixed electrode plate stick to each other.
Figure 3:
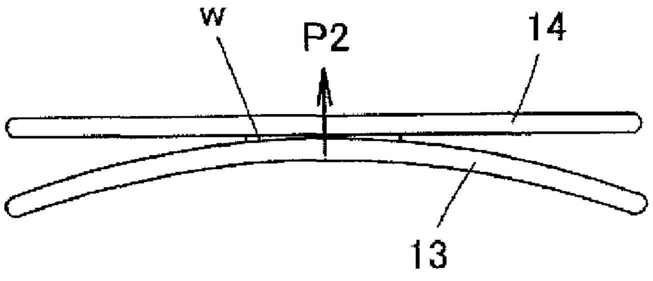

Because the opening area of the acoustic hole 43$b$ near the vent hole 45 is reduced, the dust hardly invades through the acoustic hole 43$b$, and the dust-proof property of the vibration sensor 31 is improved. As a result, the clogging of the vent hole 45, caused by the dust invading from the acoustic hole 43$b$, is hardly generated (see FIG. 2), and the prevention of the vibration of the vibrating electrode plate 34, caused by the dust deposited in the vent hole 45, is hardly generated, thereby stabilizing the sensitivity and frequency characteristic of the vibration sensor 31. Because a ratio of the acoustic hole 43$b$ having the small opening area is small, even if the acoustic hole 43$b$ clogs by the dust, the clogging of the acoustic hole 43$b$ has little influence on the noise or high-frequency characteristic of the vibration sensor 31.

On the other hand, because the acoustic hole 43$a$ provided in the inside region has the large opening area, air easily enters and exits the air gap 35 through the acoustic hole 43$a$, the vibrating electrode plate 34 is hardly damped by the air in the air gap 35 between the vibrating electrode plate 34 and the fixed electrode plate 36, and the high-frequency characteristic of the vibration sensor 31 is improved.

Because the opening area of the acoustic hole 43$a$ is increased, the area of the fixed electrode plate 36 is reduced by the increased opening area of the acoustic hole 43$a$, and the fixed electrode plate 36 is hardly subjected to the sound pressure. As a result, because the fixed electrode plate 36 is hardly vibrated by the acoustic vibration while only the vibrating electrode plate 34 is vibrated, the sensor accuracy of the vibration sensor 31 is improved.

Figure 4:
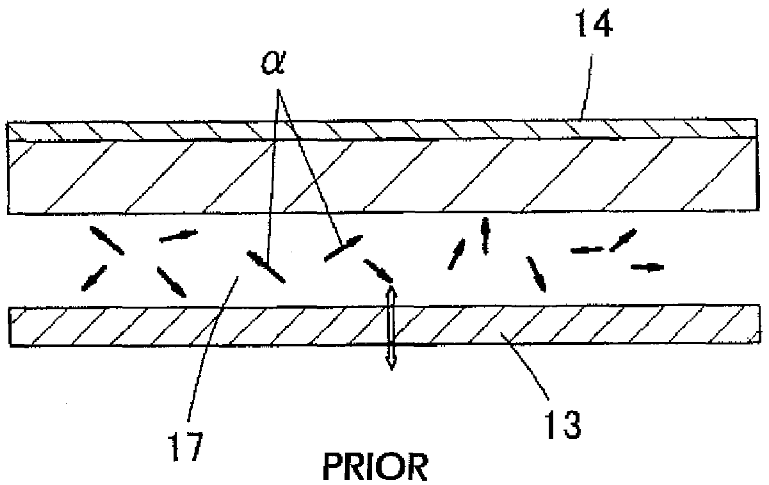
FIGS. 4(*a*) and (*b*) are schematic diagrams for explaining a thermal noise of air molecules in an air gap.
Figure 4:
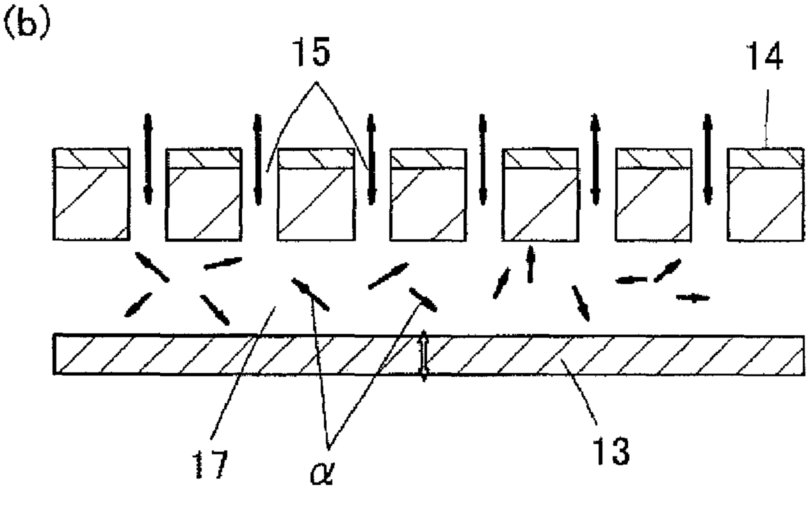

The opening area of the acoustic hole is increased to reduce the thermal noise of the vibration sensor 31 in most regions of the fixed electrode plate 36, so that the noise generated by the thermal noise can be reduced to improve the S/N ratio of the vibration sensor (see FIG. 4).

Accordingly, the vibration sensor 31 having the good high frequency characteristic, the good S/N ratio, and the good sensor accuracy can be produced without sacrificing the low-frequency characteristic and dust-proof property.

Figure 11:
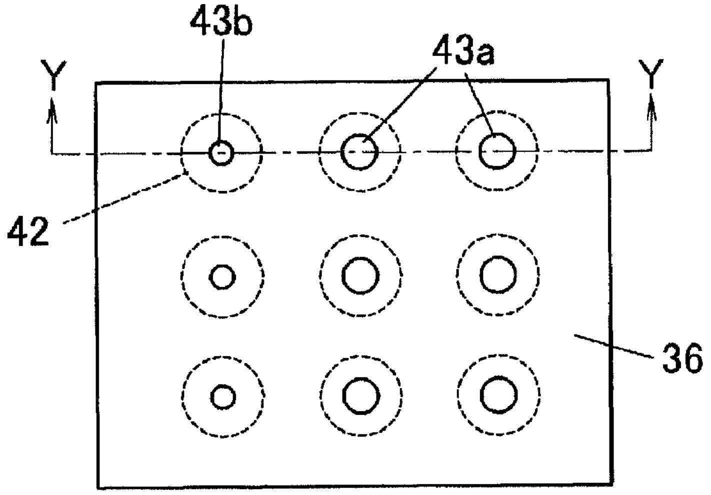
FIGS. 11(*a*), 11(*b*), and (*c*) are schematic diagrams illustrating a process for etching and removing a sacrifice layer laminated between a vibrating electrode plate and the fixed electrode plate in a process for producing the vibration sensor of the first embodiment.
Figure 11:
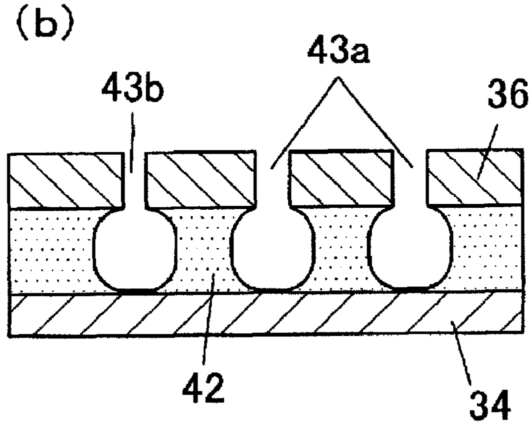
Figure 11:
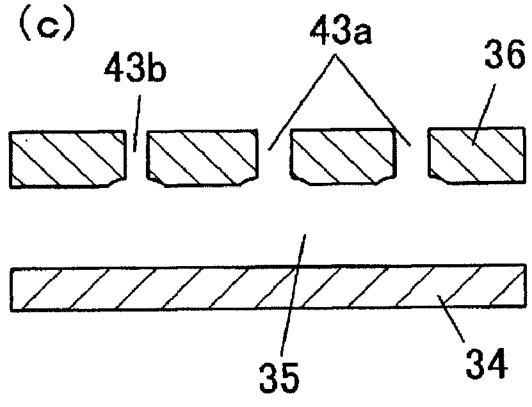

FIG. 11 illustrates a process for etching and removing the sacrifice layer 42 laminated between the vibrating electrode plate 34 and the fixed electrode plate 36 in the process for producing the vibration sensor 31. FIG. 11($a$) is a schematic plan view illustrating a state in which the sacrifice layer 42 is being etched and removed through the acoustic holes 43$a$ and 43$b$, FIG. 11($b$) is a sectional view taken on a line Y-Y of FIG. 11($a$), and FIG. 11($c$) is a schematic sectional view illustrating a state in which the removal of the sacrifice layer 42 is completed by the etching through the acoustic holes 43$a$ and 43$b$.

In the vibration sensor 31, because the acoustic holes 43$a$ and 43$b$ are regularly arrayed at substantially equal intervals irrespective of the size of the opening area, the sacrifice layer 42 is substantially evenly etched at a equal etching rate as illustrated in FIGS. 11($a$) and 11($b$) when the etching solution invades from the acoustic holes 43$a$ and 43$b$ to come into contact with the sacrifice layer 42, and the etching is substantially simultaneously ended in each regions of the sacrifice layer 42. Therefore, the etching required time is shortened because the whole of the sacrifice layer 42 is substantially simultaneously etched and removed.

Because the whole of the sacrifice layer 42 is evenly etched, the thickness is not biased such that part of the fixed electrode plate 36 is not largely etched as illustrated in FIG. 11($c$). Therefore, a crack is hardly generated by applying an uneven stress to the fixed electrode plate 36 in the middle of the sacrifice layer etching, and the characteristic of the vibration sensor 31 is stabilized.

In order to evenly etch the sacrifice layer 42, it is desirable to regularly array the acoustic holes 43$a$ and 43$b$ at constant pitch. However, when the maximum value of the center-to-center distance between the adjacent acoustic holes 43$a$ and 43$b$ becomes double the minimum value or less, the unevenness of the sacrifice layer etching does not become prominent even if the dispositions of the acoustic holes 43$a$ and 43$b$ vary slightly.

Figure 12:
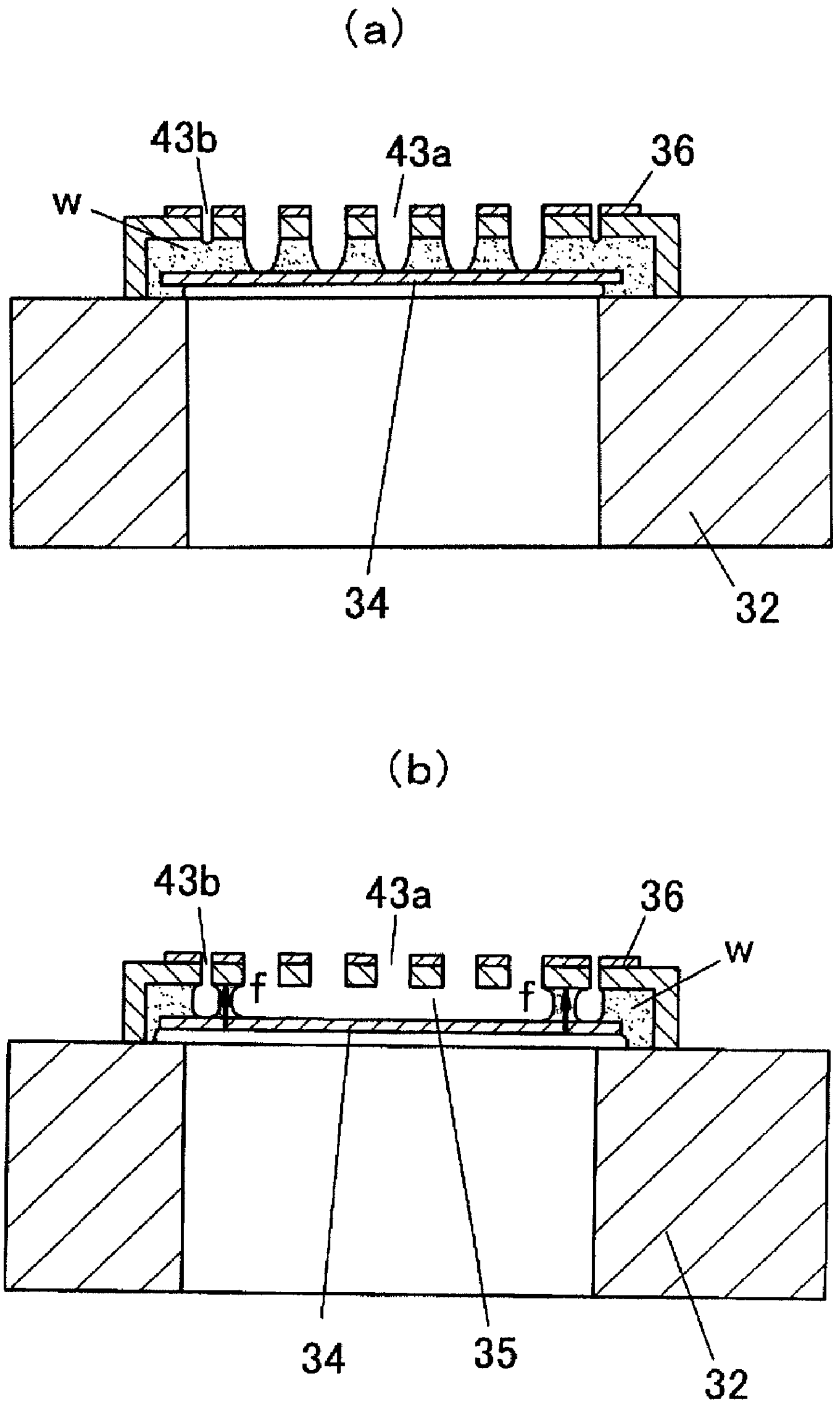
FIG. 12 is a view explaining the reason the sticking of electrode plates can be suppressed by the vibration sensor of the first embodiment.

In the vibration sensor 31, the generation of the sticking of the electrode plates can be suppressed during the production process. FIGS. 12($a$) and ($b$) are views explaining the reason the sticking of electrode plates can be suppressed. In the vibration sensor 31, the acoustic hole 43$b$ of the outer peripheral portion has the small opening area, and the acoustic hole

43*a* in the inside region has the large opening area. As illustrated in FIG. 12(*a*), even if the moisture w invades in the air gap 35 between the vibrating electrode plate 34 and the fixed electrode plate 36 in a cleaning process after the sacrifice layer etching, as illustrated in FIG. 12(*b*), the moisture w is quickly evaporated through the acoustic hole 43*a* having the large opening area in the region of the central portion of the air gap 35. Therefore, in the region of the central portion of the vibrating electrode plate 34, there is no risk of attracting the vibrating electrode plate 34 to the fixed electrode plate 36 by a capillary force of the remaining moisture w.

On the other hand, in the outer peripheral portion of the air gap 35, possibly the moisture w remains because of the small opening area of the acoustic holes 43*b*. However, because the fixed portions 38 at four corners are fixed to the silicon substrate 32 in the vibrating electrode plate 34, the outer peripheral portion of the vibrating electrode plate 34 has a spring property higher than that of the inside surface. Therefore, as illustrated in FIG. 12(*b*), the vibrating electrode plate 34 is hardly attracted to the fixed electrode plate 36 by the capillary force f of the moisture w remaining in the outer peripheral portion of the air gap 35.

The vibrating electrode plate 34 hardly remains sticking to the fixed electrode plate 36 after the moisture w is completely evaporated, thereby generating the sticking. Because the vibrating electrode plate 34 hardly sticks to the fixed electrode plate 36 even if the moisture w invades in the air gap 35, the risk of generating the sticking is reduced.

Figure 5:
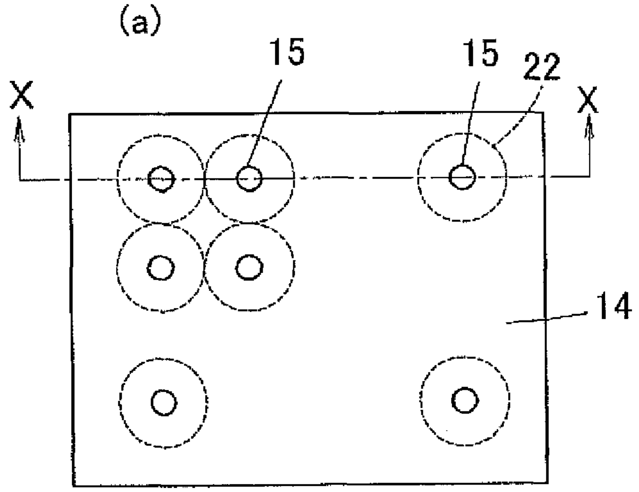
FIGS. 5(*a*), 5(*b*), and 5(*c*) are schematic diagrams explaining a state in which a sacrifice layer is etched when acoustic holes are unevenly disposed in the vibration sensor of FIG. 1.
Figure 5:
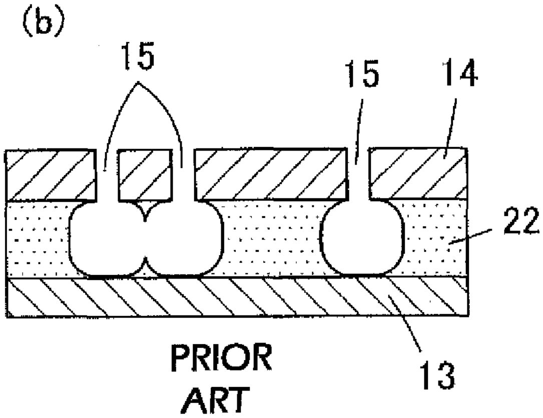
Figure 5:
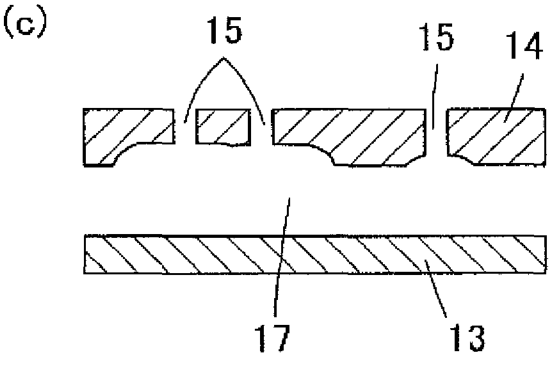

Because the acoustic holes 43*a* and 43*b* are regularly arrayed at substantially equal intervals, the vibration sensor 31 has the excellent effect that the thermal noise is relaxed by the acoustic holes 43*a* and 43*b* due to the following reason. How much each acoustic hole can efficiently relax the thermal noise largely depends on a distance from another acoustic hole in addition to the diameter of the acoustic hole. That is, in the site far away from any acoustic hole, the thermal noise is increased. When the acoustic holes 15 are unevenly disposed as illustrated in FIG. 5, because an air gap region far away from any acoustic hole 15 is generated, the thermal noise cannot be relaxed, and the low noise is hardly achieved in the vibration sensor. On the other hand, as illustrated in FIG. 11, when the acoustic holes 43*a* and 43*b* are evenly disposed, because the air gap region far away from any one of the acoustic holes 43*a* and 43*b* is hardly generated, the thermal noise can be relaxed. The acoustic holes 43*a* and 43*b* are regularly arrayed at substantially equal intervals. Therefore, the thermal noise can be relaxed while the acoustic resistance of the ventilation pathway is decreased.

(Computation Example of Diameter of Acoustic Hole)

When the acoustic holes 43*a* and 43*b* are formed into a substantially circular shape, desirably the diameter Db of the acoustic hole 43*b* of the outer peripheral portion ranges from 0.5 micrometer to 10 micrometers, and desirably the diameter Da of the inside acoustic hole 43*a* ranges from 5 micrometers to 30 micrometers (where Da>Db). Desirably the center-to-center distance p between the adjacent acoustic holes 43*a* and 43*b* ranges from 10 micrometers to 100 micrometers (where p>Da). This point is already described, and the basis will be described below.

Figure 13:
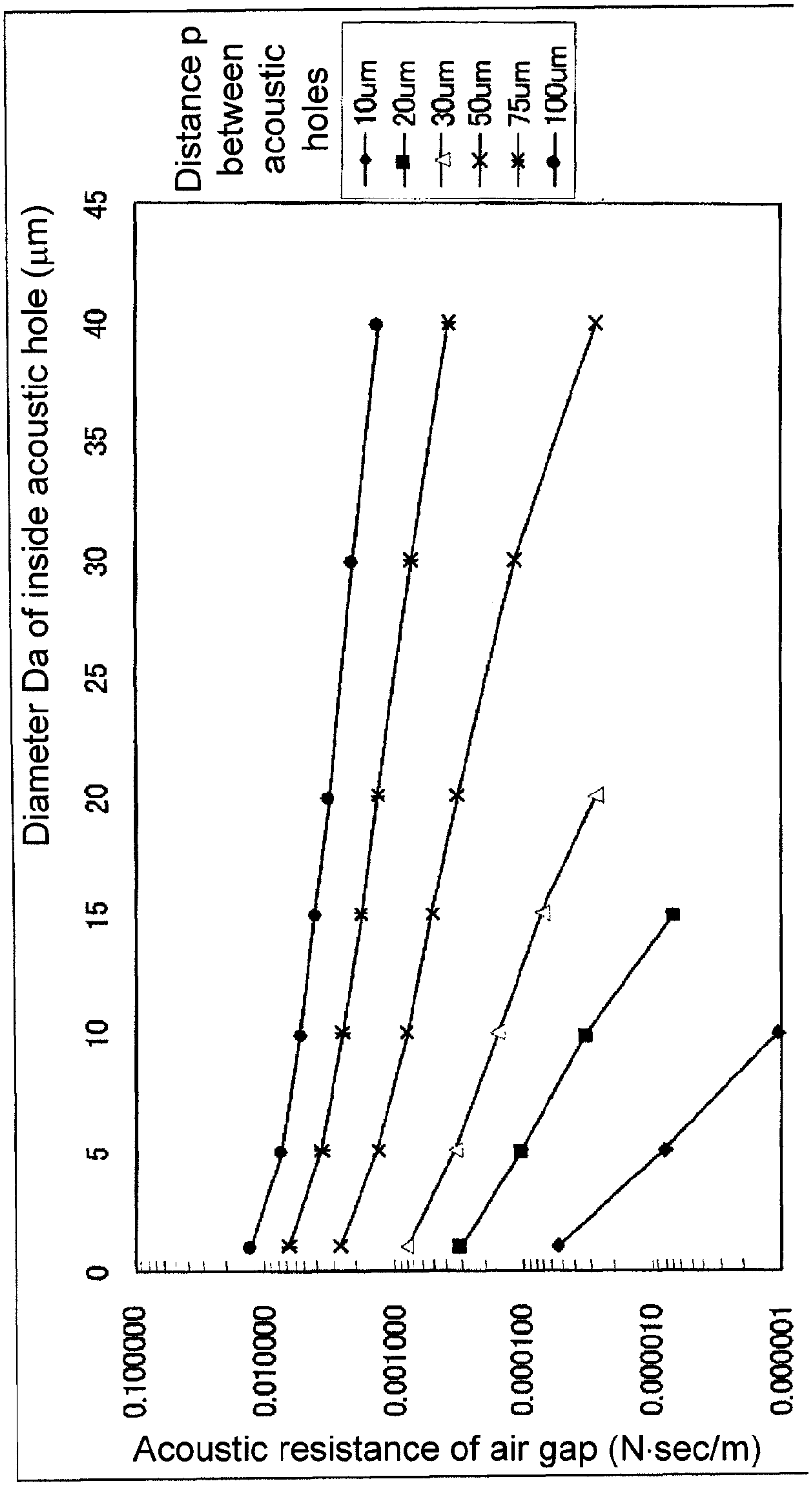
FIG. 13 is a view illustrating a relationship between a diameter of an inside acoustic hole and an acoustic resistance of an air gap.
Figure 14:
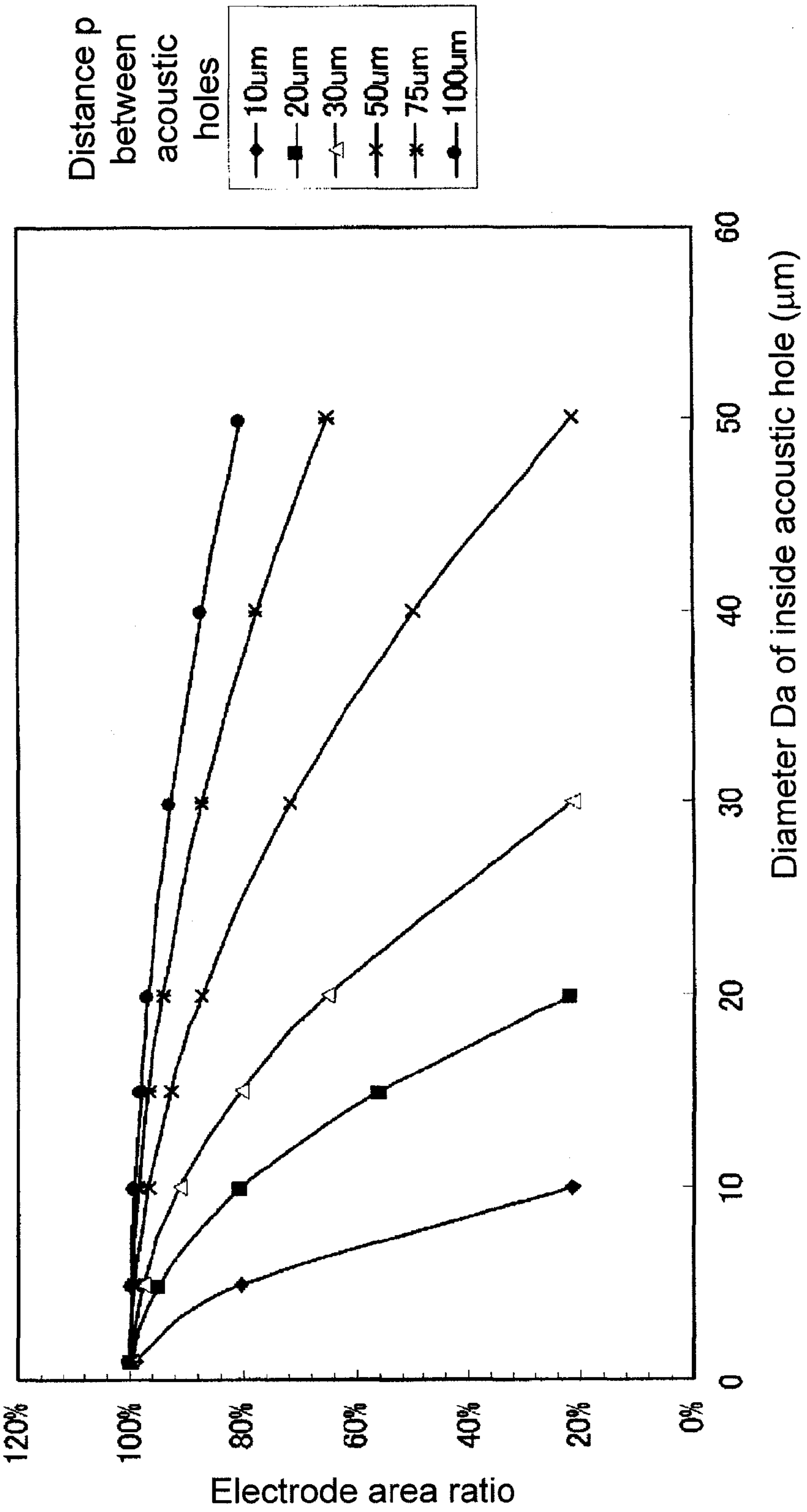
FIG. 14 is a view illustrating a relationship between the diameter of the inside acoustic hole and an electrode area ratio.
Figure 15:
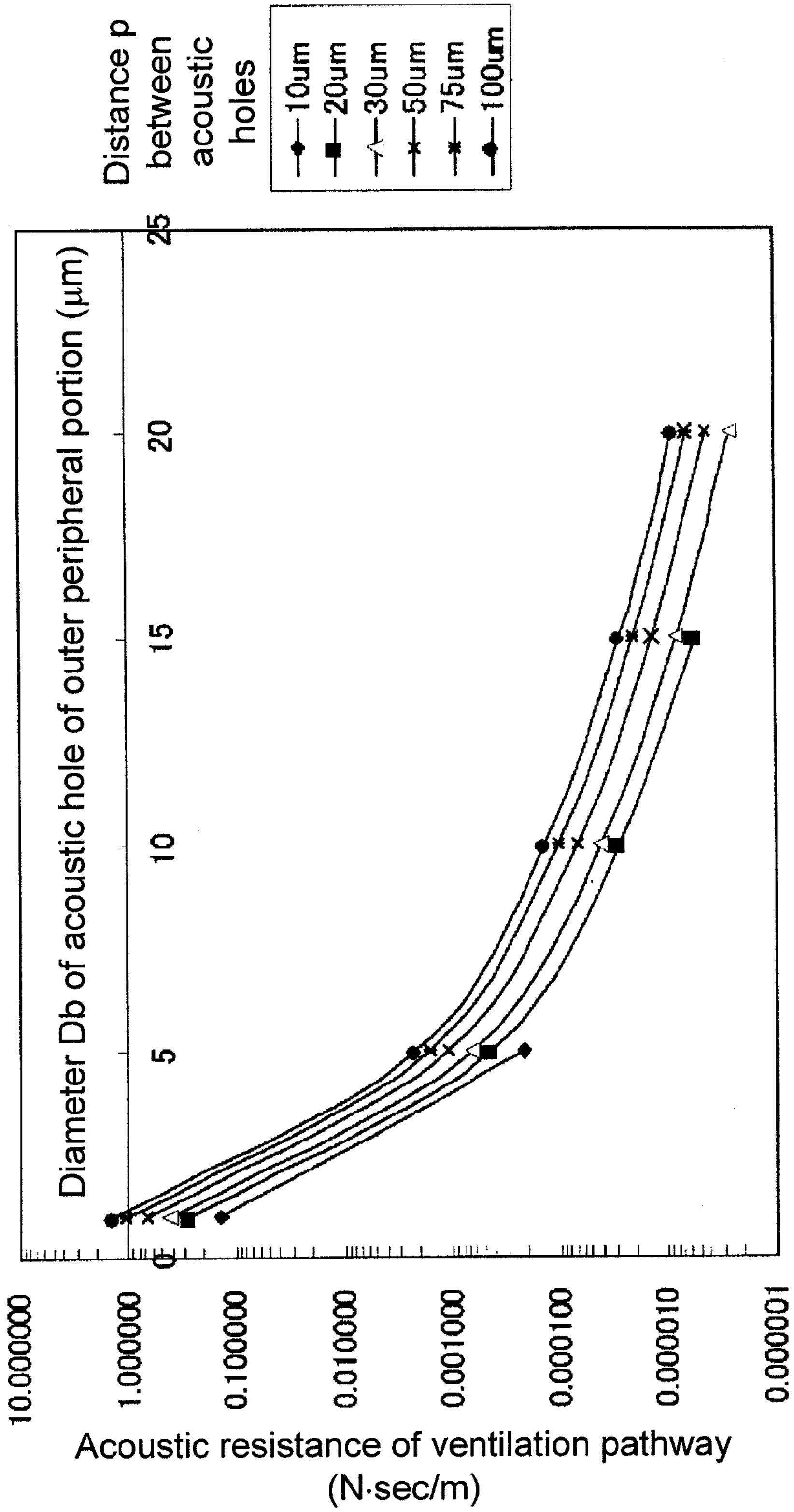
FIG. 15 is a view illustrating a relationship between a diameter of an acoustic hole of an outer peripheral portion and an acoustic resistance of a ventilation pathway.

FIG. 13 illustrates computation result of a relationship between the diameter Da of the inside acoustic hole 43*a* and the acoustic resistance of the air gap from the acoustic hole 43*a* to the through-hole 37 through the vent hole 45. FIG. 14 is a view illustrating computation result of a relationship between the diameter Da of the inside acoustic hole 43*a* and an electrode area ratio. FIG. 15 illustrates computation result of a relationship between the diameter Db of the acoustic hole 43*b* of the outer peripheral portion and the acoustic resistance of the ventilation pathway from the acoustic hole to the through-hole 37 through the vent hole 45. It is assumed that So is an area of the fixed electrode 41 when the acoustic holes 43*a* and 43*b* do not exist, and it is assumed that Sa is an area of the fixed electrode 41 when the acoustic hole 43*a* having a certain diameter Da is made. Sa/So is referred to as electrode area ratio.

As can be seen from FIG. 13, the acoustic resistance of the air gap is increased with decreasing diameter Da of the inside acoustic hole 43*a*. When the diameter Da of the inside acoustic hole 43*a* is lower than 5 micrometers, the acoustic resistance of the air gap is extremely increased to increase the noise of the vibration sensor 31. As illustrated in FIG. 14, the electrode area ratio is gradually decreased with increasing diameter Da of the inside acoustic hole 43*a*. When the diameter Da of the acoustic hole 43*a* is larger than 30 micrometers, the areas of the opposite electrodes are extremely reduced to lower the sensitivity of the vibration sensor 31. Accordingly, desirably the diameter Da of the inside acoustic hole 43*a* ranges from 5 micrometers to 30 micrometers.

As illustrated in FIG. 14, the electrode area ratio is decreased with decreasing distance p between the acoustic holes 43*a* and 43*b*. When the distance p between the acoustic holes 43*a* and 43*b* is lower than 10 micrometers, the areas of the opposite electrodes are extremely reduced to lower the sensitivity of the vibration sensor 31.

As can be seen from FIG. 13, the acoustic resistance of the air gap is increased with increasing distance p between the acoustic holes 43*a* and 43*b*. When the distance p between the acoustic holes 43*a* and 43*b* is larger than 100 micrometers, the acoustic resistance of the air gap is extremely increased to increase the noise of the vibration sensor 31.

Accordingly, the center-to-center distance p between the adjacent acoustic holes 43*a* and 43*b* ranges from 10 micrometers to 100 micrometers.

As can be seen from FIG. 15, the acoustic resistance of the ventilation pathway is decreased with increasing diameter Db of the acoustic hole 43*b* of the outer peripheral portion. When the diameter Db of the acoustic hole 43*b* of the outer peripheral portion is larger than 10 micrometers, the acoustic resistance of the ventilation pathway passing through the vent hole 45 is extremely decreased to degrade the low-frequency characteristic of the vibration sensor 31.

On the other hand, when the diameter Db of the acoustic hole 43*b* of the outer peripheral portion is lower than 0.5 micrometer, the acoustic hole 43*b* is hardly used as an entrance of the etching solution.

Accordingly, desirably the diameter Db of the acoustic hole 43*b* of the outer peripheral portion ranges from 0.5 micrometer to 10 micrometers.

(Second Embodiment)

Figure 16:
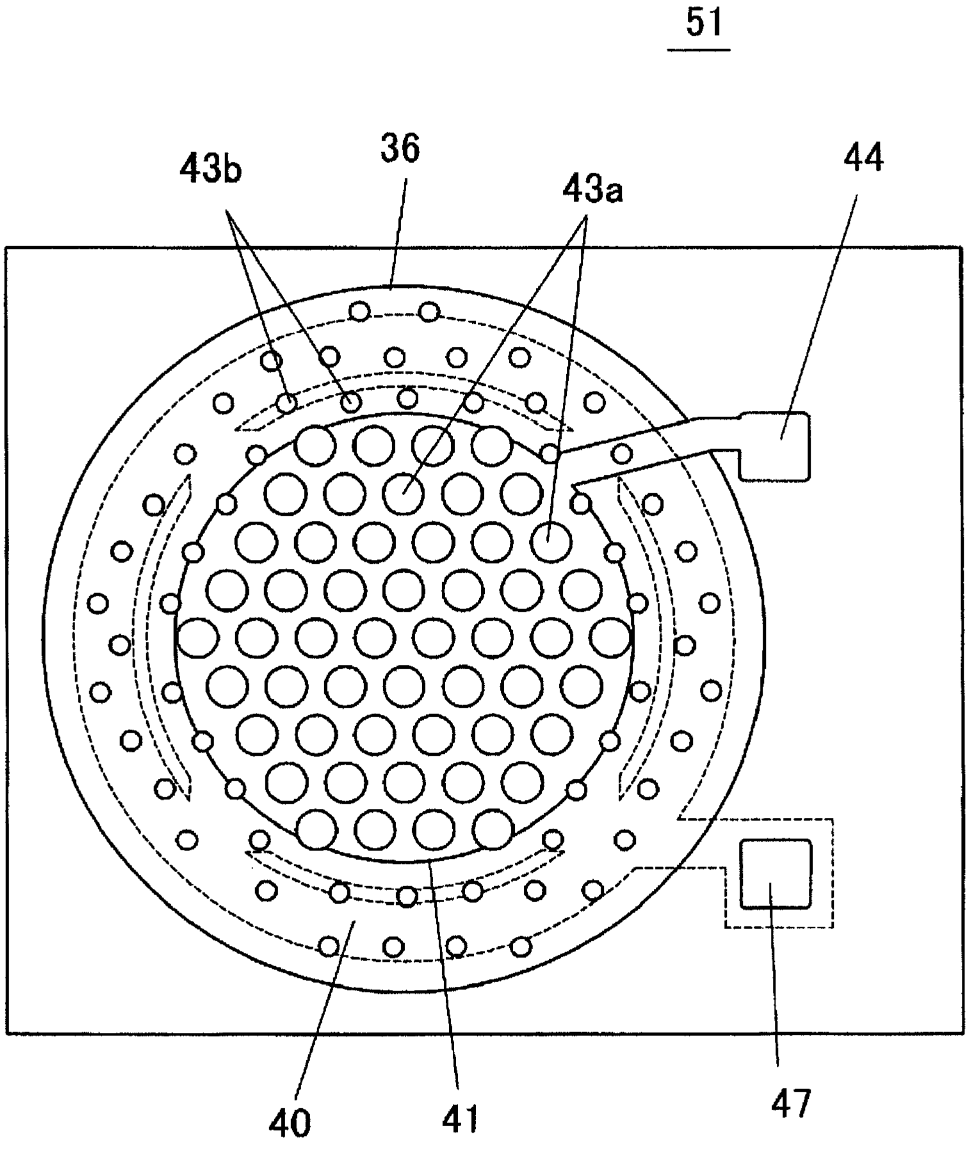
FIG. 16 is a plan view illustrating a vibration sensor according to a second embodiment of the invention.
Figure 17:
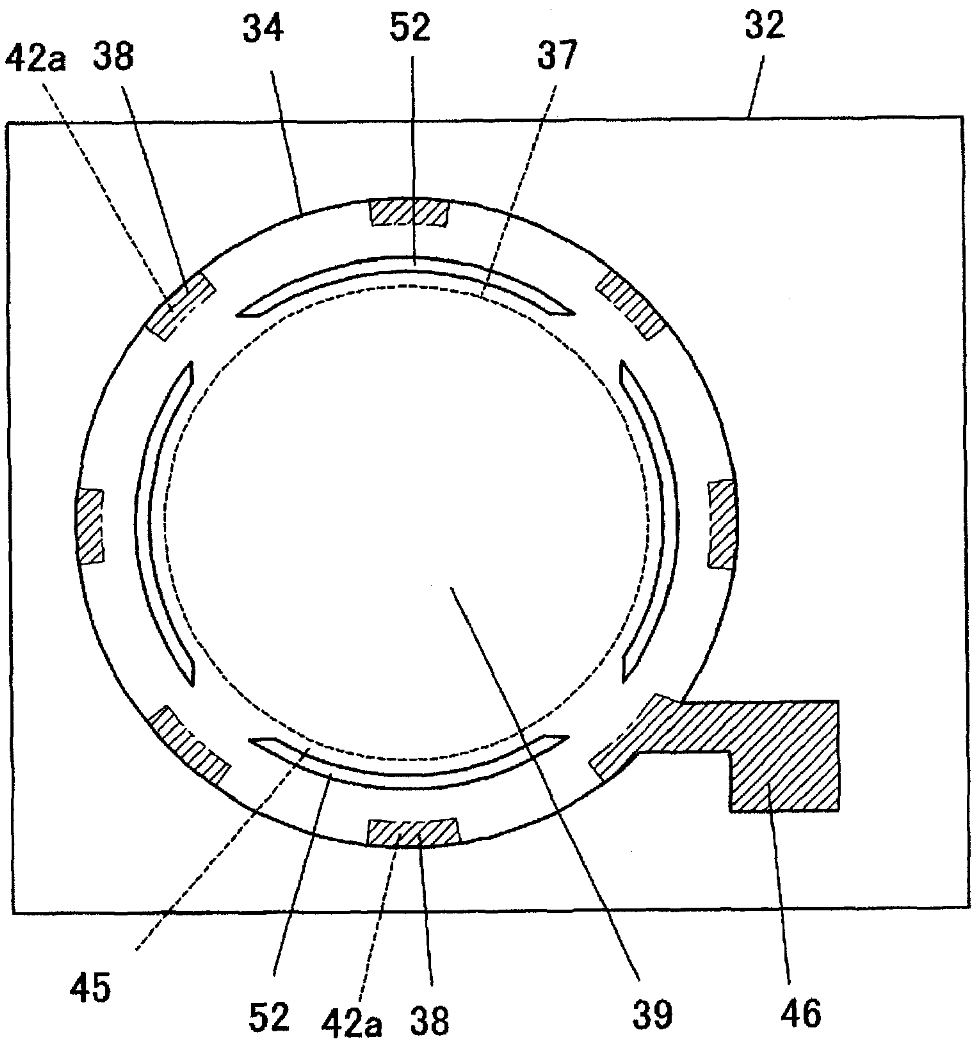
FIG. 17 is a plan view of a state in which a fixed electrode film of the vibration sensor is removed in the vibration sensor of the second embodiment.

FIG. 16 is a plan view illustrating a vibration sensor 51 according to a second embodiment of the invention. FIG. 17 is a plan view of a state in which a fixed electrode film of the vibration sensor 51 is removed. In the vibration sensor 51, a portion above the through-hole 37 of the silicon substrate 32 is covered with the vibrating electrode plate 34, and the outer peripheral portion of the vibrating electrode plate 34 is partially fixed to the upper surface of the silicon substrate 32. In the vibrating electrode plate 34, a region (fixed portion 38) fixed to the upper surface of the silicon substrate 32 by the retaining portion 42*a* formed by the sacrifice layer 42 of the upper surface of the silicon substrate 32 is expressed by a hatched line in FIG. 17. Plural slits 52 are opened in positions near the outer peripheral portion inside the outer peripheral portion fixed to the silicon substrate 32. The outer peripheral portion of the vibrating electrode plate 34 is partially fixed to the silicon substrate 32, and the spring property of the vibrating electrode plate 34 is lowered by the slits 52. Therefore, the region surrounded by the slits 52 constitutes the diaphragm 39, and the diaphragm 39 senses the small sound pressure to perform membrane oscillation.

The lower surface of the vibrating electrode plate 34 floats slightly from the upper surface of the silicon substrate 32, and the void is formed between the lower surface of the vibrating electrode plate 34 and the upper surface of the silicon substrate 32 between the slit 52 and the through-hole 37, and the void constitutes the vent hole 45 that communicates the slit 52 and the through-hole 37 with each other.

In the vibration sensor 51, as with the vibration sensor 31 of the first embodiment, the fixed electrode plate 36 is formed such that the vibrating electrode plate 34 is covered therewith, and the acoustic holes 43*a* and 43*b* are regularly arrayed at a constant pitch in the region opposite to the vibrating electrode plate 34 in the fixed electrode plate 36. The opening area of the acoustic hole 43*b* of the outer peripheral portion is smaller than that of the acoustic hole 43*a* in the inside region. Accordingly, the same effect as the vibration sensor 31 of the first embodiment is obtained in the vibration sensor 51.

FIGS. 16 and 17 illustrate the circular vibrating electrode plate 34. Alternatively, the outer peripheral portion of the square vibrating electrode plate 34 is partially fixed to the upper surface of the silicon substrate 32, and the spring property may be lowered by the slits.

(Third Embodiment)

Figure 18:
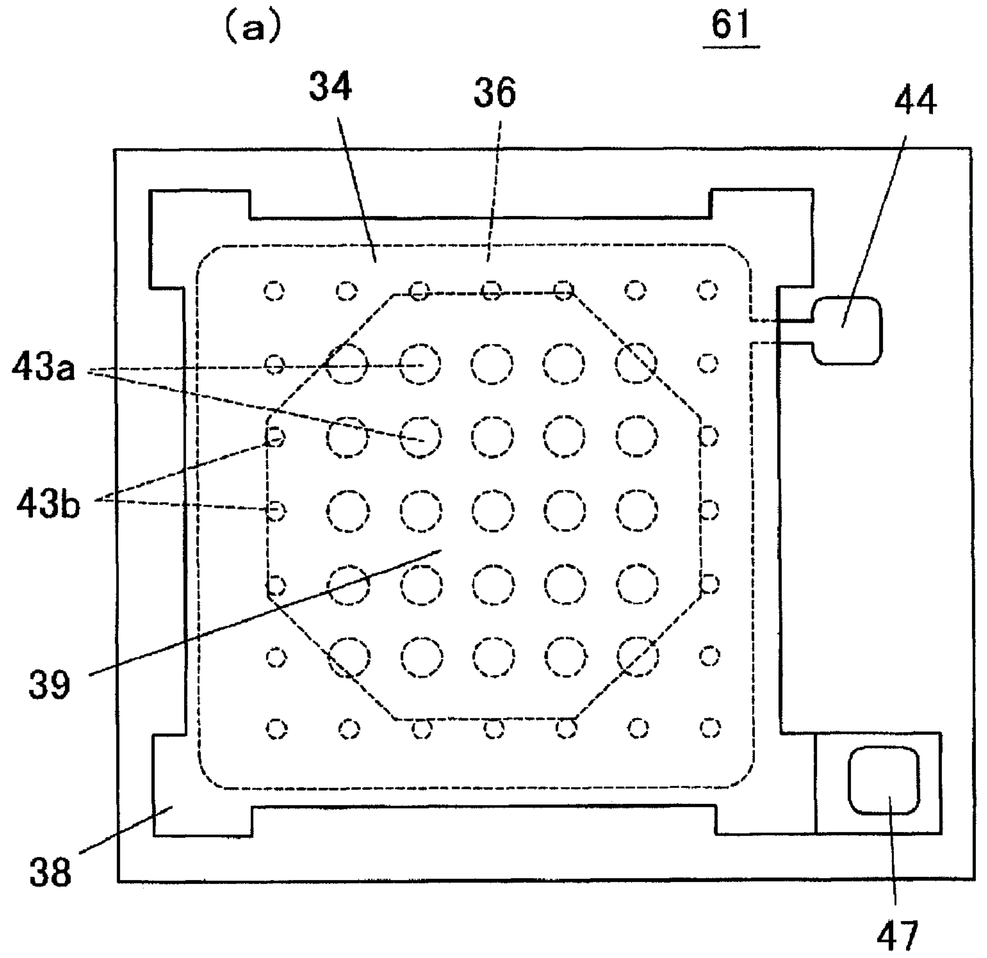
FIG. 18(*a*) is a plan view illustrating a vibration sensor according to a third embodiment of the invention, and FIG. 18(*b*) is a schematic sectional view of the vibration sensor.
Figure 18:
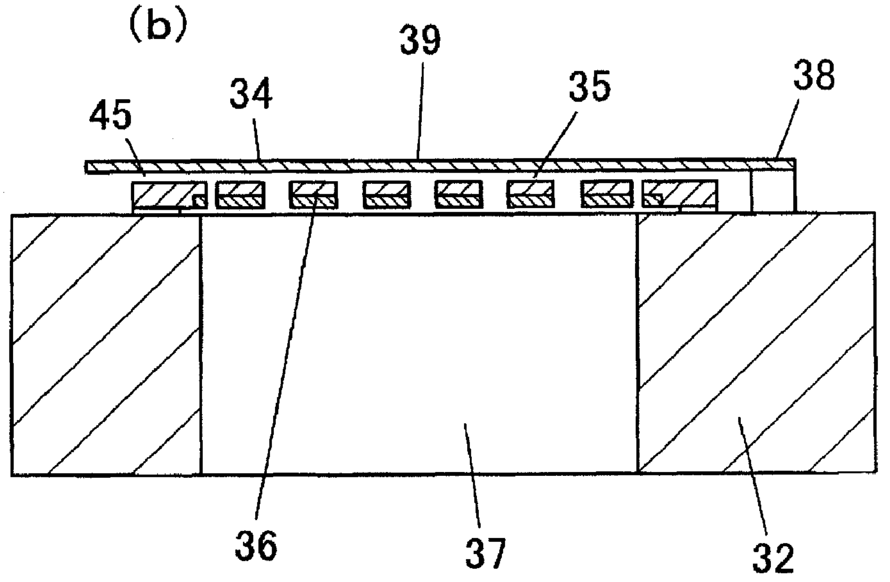

FIG. 18(*a*) is a plan view illustrating a vibration sensor 61 according to a third embodiment of the invention, and FIG. 18(*b*) is a schematic sectional view of the vibration sensor 61. In the first and second embodiments, the vibrating electrode plate 34 and the fixed electrode plate 36 are formed in order on the silicon substrate 32. As illustrated in FIG. 18, the fixed electrode plate 36 and the vibrating electrode plate 34 may be formed in order on the silicon substrate 32. Because other structures are similar to those of the first embodiment, the description is omitted. In the third embodiment, the acoustic vibration propagating from the through-hole 37 of the silicon substrate 32 propagates to the vibrating electrode plate 34 through the acoustic holes 43*a* and 43*b*, and the vibrating electrode plate 34 is vibrated by the acoustic vibration.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An electrostatic capacitive vibration sensor comprising:

a substrate;

a through-hole penetrating the substrate;

a vibrating electrode plate; and a fixed electrode plate opposite the vibrating electrode plate; wherein the fixed electrode plate is subjected to vibration to perform membrane oscillation, a plurality of acoustic holes are made in the fixed electrode plate, the vibrating electrode plate and the fixed electrode plate are disposed on a surface side of the substrate such that an opening on the surface side of the substrate of the through-hole is covered therewith, a lower surface of an outer peripheral portion of the vibrating electrode plate is partially fixed to the substrate, a vent hole that communicates a surface side and a rear surface side of the vibrating electrode plate with each other is made between the surface of the substrate and the lower surface of the vibrating electrode plate, and in a region opposite to the vibrating electrode plate in the fixed electrode plate, an opening area of the acoustic hole of the outer peripheral portion is smaller than an average value of opening areas of the acoustic holes in an inside region.

2. The electrostatic capacitive vibration sensor according to claim 1, wherein a plurality of small regions are defined in an acoustic hole forming region of the fixed electrode plate, the small regions being regularly arrayed while having an even shape and an even area, and one acoustic hole is made in each small region such that a center of the acoustic hole falls within the small region.

3. The electrostatic capacitive vibration sensor according to claim 2, wherein the acoustic holes made in the fixed electrode plate are regularly arrayed.

4. The electrostatic capacitive vibration sensor according to claim 1, wherein, in the fixed electrode plate, a diameter of the small-opening-area acoustic hole made in the outer peripheral portion of the region opposite to the vibrating electrode plate ranges from 0.5 micrometer to 10 micrometers, a diameter of the acoustic hole made except the outer peripheral portion of the region ranges from 5 micrometers to 30 micrometers, and a center-to-center distance of the adjacent acoustic holes ranges from 10 micrometers to 100 micrometers.

5. The electrostatic capacitive vibration sensor according to claim 1, wherein a slit is opened to the region except the fixed portion in or near the outer peripheral portion of the vibrating electrode plate.

6. The electrostatic capacitive vibration sensor according to claim 1, wherein a plurality of retaining portions are provided at intervals in the surface of the substrate, and the lower surface of the outer peripheral portion of the vibrating electrode plate is partially supported by the retaining portions.

* * * * *